US008259399B2

(12) United States Patent
Seo

(10) Patent No.: US 8,259,399 B2
(45) Date of Patent: Sep. 4, 2012

(54) LENS OPTICAL SYSTEM AND DIGITAL CAMERA MODULE INCLUDING THE SAME

(75) Inventor: Jin-seon Seo, Jinju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 12/939,333

(22) Filed: Nov. 4, 2010

(65) Prior Publication Data

US 2011/0141576 A1   Jun. 16, 2011

(30) Foreign Application Priority Data

Dec. 15, 2009   (KR) .................. 10-2009-0125033

(51) Int. Cl.
*G02B 17/00* (2006.01)
*G02B 15/14* (2006.01)
(52) U.S. Cl. ........................... 359/733; 359/684
(58) Field of Classification Search ............. 359/676, 359/683, 684, 733
See application file for complete search history.

(56) References Cited

U.S. PATENT DOCUMENTS

2011/0043664 A1* 2/2011 Mihara .................. 348/240.3
* cited by examiner

*Primary Examiner* — William Choi
(74) *Attorney, Agent, or Firm* — Drinker Biddle & Reath LLP

(57) ABSTRACT

A lens optical system includes a first optical system which includes, in order from an object side to an image side along an optical axis, a first lens group having a positive refractive power and including a first reflection member to redirect an optical path of light representing an object from a first direction toward an image sensor, a second lens group having a negative refractive power, a third lens group having a positive refractive power, a fourth lens group having a positive refractive power, and a fifth lens group having a positive refractive power. During zooming from a wide mode to a tele mode, the first lens group and the fifth lens group are fixed, the second lens group moves toward the image side, the third lens group and the fourth lens group move toward the object side, and the fourth lens group performs focusing.

20 Claims, 18 Drawing Sheets

LENS OPTICAL SYSTEM AND DIGITAL CAMERA MODULE INCLUDING THE SAME

CROSS-REFERENCE TO RELATED PATENT APPLICATIONS

This application claims the priority benefit of Korean Patent Application No. 10-2009-0125033, filed on Dec. 15, 2009, in the Korean Intellectual Property Office, the disclosure of which is incorporated herein in its entirety by reference.

BACKGROUND

1. Field of the Invention

Embodiments relate to a lens optical system and a digital camera module including the lens optical system, and more particularly, to a lens optical system suitable for a digital camera and a mobile communications apparatus, and a digital camera module including the lens optical system.

2. Description of the Related Art

As the size and thickness of digital cameras have been decreased, most cameras employ a refractive optical system to cope with the trend. Also, many digital cameras employ a zoom optical system to improve convenience. However, as the size and thickness of the digital camera decreases, the inner space of the digital camera decreases as well so that a focal length may be limited by using the zoom optical system only. That is, there is a limit in increasing an optical zoom magnification ratio. Thus, there is a demand to simultaneously employ a single focus wide-angle optical system with the zoom optical system. However, since two sensors are needed for two optical systems, the volume and manufacturing cost of a digital camera increase.

As the use of mobile communications devices becomes popular, a demand not only for a basic communications function but for related additional functions increases. Also, a demand for mobile communications devices having a wireless internet communications function or a digital camera function increases. Recently, mobile communications devices, such as camera phones capable of taking a picture and making a video call by combining the wireless internet communications function and the digital camera function, have been introduced.

The mobile communications device is equipped with two camera modules, that is, one for video calling and the other for general image photography. This is because, in the video calling and the general image photography, objects are located at the opposite sides with respect to a screen of the mobile communications device. To implement the two camera modules, two optical systems and two image sensors are needed. Furthermore, to realize a high resolution and high performance camera modules according to the user's demands, the manufacturing costs of the mobile communications device increase.

SUMMARY

To solve the above and/or other problems, a lens optical system and a digital camera module including the lens optical system may implement a wide angle and a bright lens which are difficult to have in a refractive optical system and simultaneously achieve a compact size that is a characteristic of the bending optical system.

According to an embodiment, a lens optical system includes a first optical system which includes, in order from an object side to an image side along an optical axis, a first lens group having a positive refractive power and including a first reflection member to redirect an optical path of light representing an object from a first direction toward an image sensor, a second lens group having a negative refractive power, a third lens group having a positive refractive power, a fourth lens group having a positive refractive power, and a fifth lens group having a positive refractive power, in which, during zooming from a wide mode to a tele mode, the first lens group and the fifth lens group are fixed, the second lens group moves toward the image side, the third lens group and the fourth lens group move toward the object side, and the fourth lens group performs focusing.

The first lens group may include, in order from the object side along the optical axis, a negative meniscus lens having a convex surface facing the object side, a right-angle prism redirecting the optical path by 90° toward the image sensor, and a double-convex lens.

At least one of a surface of the negative meniscus lens and a surface of the double-convex lens may be an aspherical surface.

The second lens group may include at least one unit of an aspherical lens.

The third lens group may include at least one unit of an aspherical lens.

The fourth lens group may include at least one unit of an aspherical lens.

The fifth lens group may include a doublet lens of a lens having a positive refractive power and a lens having a negative refractive power.

The lens optical system may satisfy Inequality 1 that $1.0<|dT/f2|<1.5$, wherein "dT" denotes the interval between the first lens group and the second lens group in a tele mode, and "f2" denotes the focal length of the second lens group.

The lens optical system may satisfy Inequality 2 that $2.0<|f1/f2|<3.0$, wherein "f1" denotes the focal length of the first lens group, and "f2" denotes the focal length of the second lens group.

The lens optical system may further include a second optical system, the second optical system comprising a first lens group that includes a second reflection member to redirect an optical path of light representing an object from a second direction toward the image sensor, and the second optical system sharing at least one optical element with the first optical system.

The first lens group of the second optical system may have a negative refractive power.

The shared at least one optical element may include the third, fourth, and fifth lens groups of the first optical system.

The lens optical system may include the image sensor toward which the light representing the object from the first direction and the light representing the object from the second direction are redirected.

The first optical system may be a zoom lens optical system and the second optical system may be a single focus optical system having a focal length shorter than the zoom lens optical system.

The second reflection member of the second optical system may be driven to be selectively arranged between the second lens group and the third lens group of the first optical system. The second reflection member may be a reflection mirror capable of pivoting, or a movable right-angle prism.

The first lens group of the second optical system may include at least one unit of an aspherical lens and may include a negative meniscus lens, a positive meniscus lens, and the second reflection member, in order from the object side to the image side along the optical axis.

The first and second directions may be opposite to each other on different axes.

The first and second directions may be identical directions on different axes.

According to an embodiment, a digital camera module includes the first optical system and the second optical system, wherein the first optical system is used for a general photographing mode and the second optical system is used for a self-image photographing mode. The digital camera module may include the image sensor.

BRIEF DESCRIPTION OF THE DRAWINGS

The above and other features and advantages will become more apparent by describing in detail exemplary embodiments with reference to the attached drawings in which.

DETAILED DESCRIPTION

Figure 1:
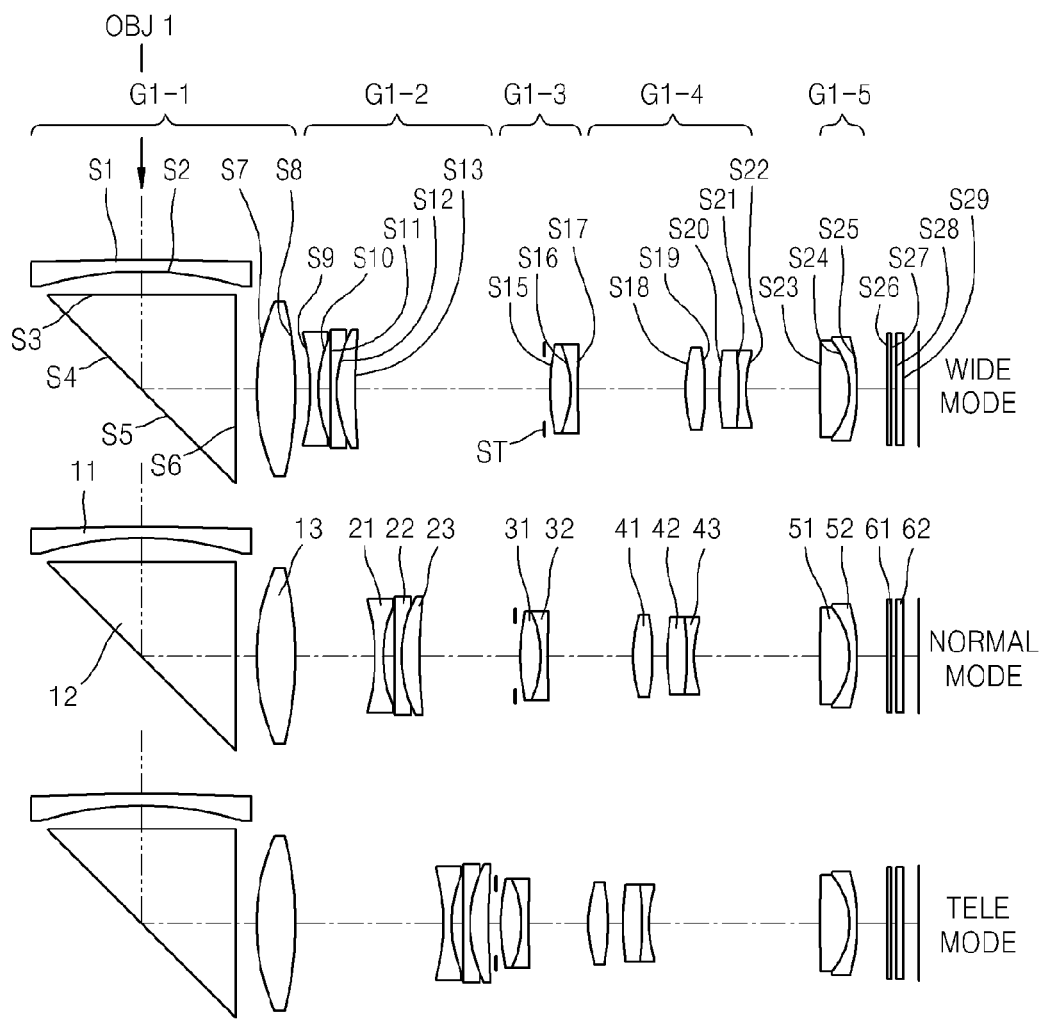
FIG. 1 schematically illustrates a first optical system according to an embodiment, operating respectively in a wide mode, a normal mode, and a tele mode.

The attached drawings for illustrating exemplary embodiments are referred to in order to gain a sufficient understanding of the invention, the merits thereof, and the objectives accomplished by an implementation of the invention. Hereinafter, exemplary embodiments will be described in detail with reference to the attached drawings. Like reference numerals in the drawings denote like elements.

FIG. 1 schematically illustrates a first optical system according to an embodiment, operating respectively in a wide mode, a normal mode, and a tele mode. In the present embodiment, the first optical system may be a zoom lens optical system having a wide mode, a normal mode, and a tele mode.

The first optical system of the present embodiment is formed of five lens groups G1-1, G1-2, G1-3, G1-4, and G1-5. The first optical system includes a first lens group G1-1, a second lens group G1-2, a third lens group G1-3, a fourth lens group G1-4, and a fifth lens group G1-5, which are sequentially arranged along an optical axis from an object side to an image side. An infrared ray filter 61 may be arranged in front of a photographing device 62 along the optical axis at the image side.

The first lens group G1-1 may include a first incident lens 11, a first reflection member 12, and a double-convex lens 13. The first reflection member 12 refracts the optical path of light representing an object in a first direction (object light OBJ1), by 90°, to proceed toward the photographing device 62. The first reflection member 12 may be a right-angle prism or a reflection mirror. The first incident lens 11 may be a negative meniscus lens in which a convex surface faces the object. The first lens group G1-1 may have a positive refractive power.

At least one of the surfaces of lenses forming the first lens group G1-1 may be aspherical. That is, at least one of the surfaces of the negative meniscus lens 11 or the double-convex lens 13 may be aspherical. Thus, longitudinal chromatic aberration and lateral chromatic aberration generated in the first lens group G1-1 may be sufficiently corrected. The first lens group G1-1 is fixed during zooming from the wide mode to the tele mode.

The second lens group G1-2 has a positive refractive power. The second lens group G1-2 may include three units of lenses 21, 22, and 23, which may be two units of double-concave lenses 21 and 22 and one unit of a positive meniscus lens 23. The second lens group G1-2 moves toward the image side during the zooming from the wide mode to the tele mode.

The second lens group G1-2 may include at least one aspherical lens. Particularly, the double-concave lens 21 located closest to the object side may be an aspherical lens. Accordingly, spherical aberration in the tele mode may be effectively controlled. An aperture ST is located between the second lens group G1-2 and the third lens group G1-3.

The third lens group G1-3 has a positive refractive power. The third lens group G1-3 may include two units of lenses 31 and 32, which may be one unit of a double-convex lens 31 and one unit of a double-concave lens 32. The double-convex lens 31 and the double-concave lens 32 are combined to each other to form a doublet lens that is useful to remove chromatic aberration. Since an aspherical lens is used as the double-convex lens 31, spherical aberration may be effectively controlled.

The third lens group G1-3 moves toward the object side during the zooming from the wide mode to the tele mode. Since the third lens group G1-3 is not fixed during the zooming, a space for a second reflection member 73 between the second and third lens groups G1-2 and G1-3 may be easily secured during single focus driving in a second optical system that will be described later. Also, during zooming, since the amount of movement of the second and fourth lens groups G1-2 and G1-4 is reduced and the number of lens groups to be moved during focusing is minimized, the miniaturization of a barrel and high zooming ratio may be easily obtained.

The fourth lens group G1-4 has a positive refractive power. The fourth lens group G1-4 may include three units of lenses 41, 42, and 43, which may be two units of double-convex lenses 41 and 42 and one unit of a double-concave lens 43. The second double-convex lens 42 and the double-concave lens 43 are combined to each other to form a doublet lens that is useful to sufficiently correct basic aberration. Particularly, by using a doublet lens of the double-convex lens 42 having a high variation value and the double-concave lens 43 having a low variation value, chromatic aberration generated during high magnification zooming may be minimized.

Also, since an aspherical lens is used as the first double-convex lens 41, spherical aberration may be minimized. The fourth lens group G1-4 moves toward the object side during the zooming from the wide angle mode to the tele mode. Furthermore, the fourth lens group G1-4 may perform an auto-focusing function.

The fifth lens group G1-5 has a positive refractive power. Thus, a final image forming magnification ratio is increased and the miniaturization of the barrel may be obtained. The fifth lens group G1-5 may include two units of lenses 51 and 52, which may be a doublet lens of the double-convex lens 51 and the negative meniscus lens 52. The fifth lens group G1-5 is fixed during the zooming from the wide angle mode to the tele mode.

The first optical system may satisfy Inequality 1 below.

$$1.0 < |dT/f2| < 1.5 \qquad \text{[Inequality 1]}$$

In Inequality 1, "dT" denotes the interval between the first lens group G1-1 and the second lens group G1-2 in the tele mode, and "f2" denotes the focal length of the second lens group G1-2. If the value of "|dT/f2|" is smaller than 1.0, the power of the second lens group G1-2 decreases and the amount of movement of the second lens group G1-2 increases so that the size of the optical system may be increased. In contrast, if the value of "|dT/f2|" is larger than 1.5, the power of the second lens group G1-2 increases, which is advantageous in the miniaturization of the second lens group G1-2. However, since spherical aberration and astigmatism are greatly generated, overall aberration is difficult to correct.

The first optical system may satisfy Inequality 2 below.

$$2.0 < |f1/f2| < 3.0 \qquad \text{[Inequality 2]}$$

In Inequality 2, "f1" denotes the focal length of the first lens group G1-1, and "f2" denotes the focal length of the second lens group G1-2. Inequality 2 is a conditional expression to define the focal length of the first lens group G1-1 and the focal length of the second lens group G1-2. In Inequality 2, if the value of "|f1/f2|" is smaller than 2.0, the focal length of the first lens group G1-1 is decreased and the correction of distortion aberration becomes difficult. In contrast, if the value of "|f1/f2|" is larger than 3.0, the focal length of the first lens group G1-1 is increased so that the miniaturization of the barrel may be difficult and performance correction in the tele mode may be difficult.

Figure 2:
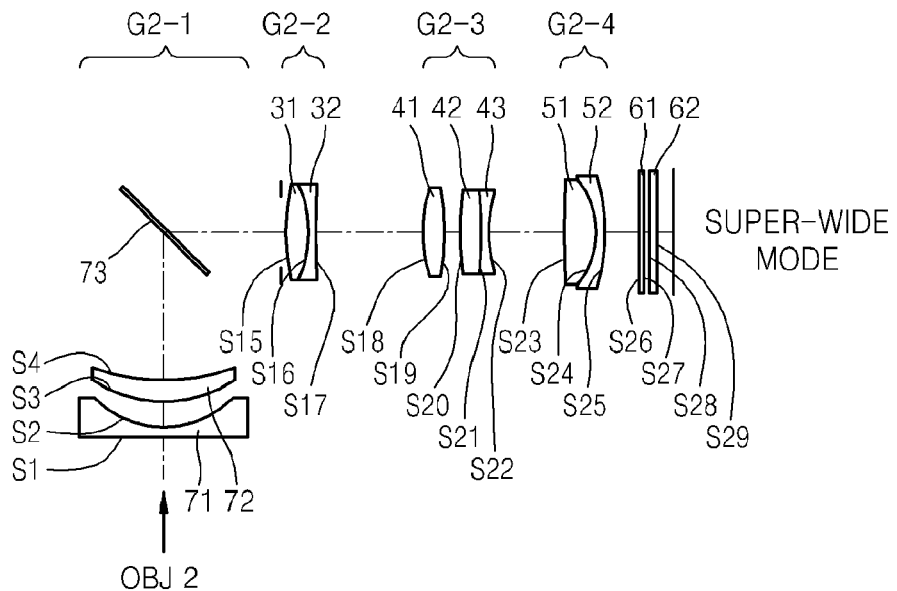
FIG. 2 schematically illustrates a second optical system according to an embodiment.

FIG. 2 schematically illustrates a second optical system according to an embodiment. The second optical system according to the present embodiment may be used as an embodiment of a lens optical system by being coupled to the first optical system of FIG. 1.

Referring to FIG. 2, the second optical system may include four lens groups G2-1, G2-2, G2-3, and G2-4. For example, the second optical system includes a first lens group G2-1, a second lens group G2-2, a third lens group G2-3, and a fourth lens group G2-4, which are sequentially arranged along the optical axis from the object side toward the image side. The second optical system is a single focus super-wide angle optical system.

The first lens group G2-1 of the second optical system may include a negative meniscus lens 71, a positive meniscus lens 72, and a second reflection member 73. The negative meniscus lens 71 is a second incident lens. The first lens group G2-1 of the second optical system has a negative refractive power. The first lens group G2-1 includes at least one unit of aspherical lens. As the first lens group G2-1 includes the negative meniscus lens 71 and the positive meniscus lens 72 in order from the object side to the image side along the optical axis, the overall lens optical system may be made compact and distortion may be effectively minimized.

The second incident lens 71 faces the opposite direction to a direction in which the first incident lens 11 of the first optical system faces. That is, the second optical system that is the single focus super-wide angle optical system is used to photograph an object (using object light OBJ2) located at the opposite side to the first optical system.

The second reflection member 73 selectively refracts the optical path of object light in a second direction to proceed toward a photographing device 62. For example, when the second reflection member 73 is moved to be located between the second lens group G1-2 and the third lens group G1-3 of the first optical system, object light OBJ2 input in the second direction is formed on the photographing device 62. In contrast, when the second reflection member 73 is moved to be out of the first optical system, object light OBJ1 input in the first direction is formed on the photographing device 62. The second reflection member 73 may be a rotary reflection mirror or a movable right-angle prism.

The second lens group G2-2 of the second optical system is the third lens group G1-3 of the first optical system. The third lens group G2-3 of the second optical system is the fourth lens group G1-4 of the first optical system. The fourth lens group G2-4 of the second optical system is the fifth lens group G1-5 of the first optical system. That is, the first and second optical systems share the three lens groups G1-3, G1-4, and G1-5 and the photographing device 62. Also, when an infrared ray filter 61 is further arranged in front of the photographing device 62 along the optical axis, an infrared ray filter 61 is shared by the first and second optical systems. Accordingly, since the second optical system sharing the three lens groups G1-3, G1-4, and G1-5 of the first optical system needs only the first lens group G2-1, the whole size and manufacturing costs of the lens optical system may be reduced.

In a first optical mode in which the first optical system is used, the object light OBJ1 input through the first incident lens 11 in one direction is refracted by 90° by the first reflection member 12 to proceed toward the photographing device 62. For example, in a digital camera or a camera phone, the first optical mode may be used when a user photographs an object by using the first optical system.

In a second optical mode in which the second optical system is used, the user may photograph a self-image or make a video call. This is because the second optical system may enable photography of the object light OBJ2 input through the second incident lens 71 in the opposite direction.

In the present embodiment, the switching between the first optical mode and the second optical mode is performed by the rotation of the second reflection member 73. For example, in the second optical mode, the second reflection member 73 pivots by 45° and thus the object light OBJ2 proceeds toward the photographing device 62. In contrast, in the first optical mode, the second reflection member 73 pivots to be close to the positive meniscus lens 72 and thus the object light OBJ1 traveling in the opposite direction is refracted by the first reflection member 12 to proceed toward the photographing device 62.

The focal length of the second optical system is shorter than that of the first optical system in the wide mode. As described above, the second optical system is used for the self photography or video calling. Since the user is located close to a camera module, a wide viewing angle is preferable. In the present embodiment, the focal length of the second optical system is shorter than that of the first optical system in the wide mode. Accordingly, since photography at a super-wide angle is available, the present embodiment is suitable for the self photography or video calling. Also, the second optical system used for the self photography or video calling shares the photographing device 62 used by the first optical system. Thus, self photography or video calling at a high resolution is available.

Figure 3:
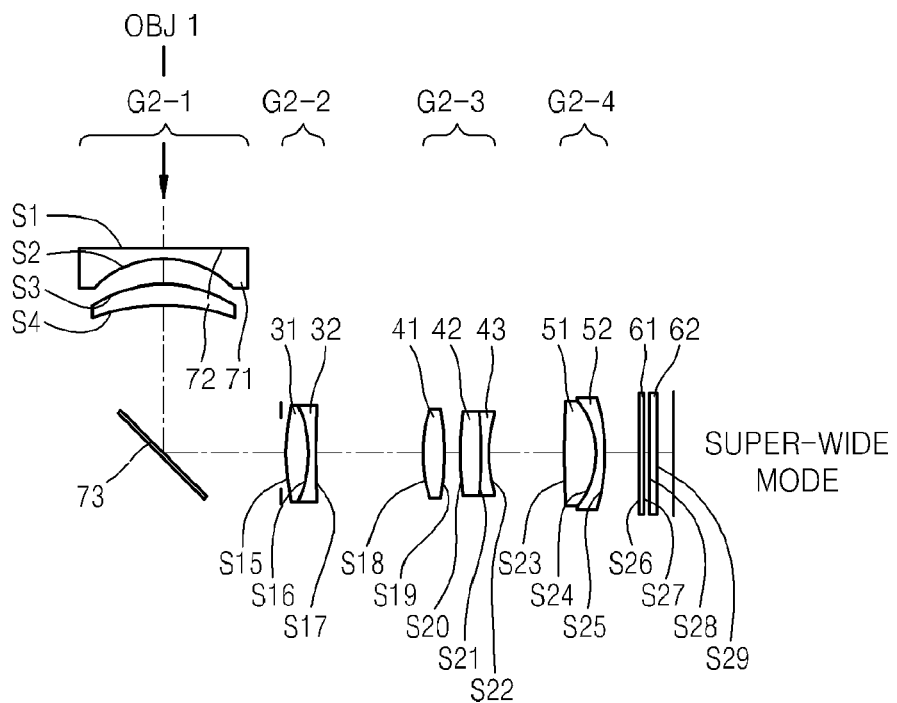
FIG. 3 schematically illustrates a second optical system according to another embodiment.

FIG. 3 schematically illustrates a second optical system according to another embodiment. The second optical system according to the present embodiment may be used as an embodiment of a lens optical system by being coupled to the first optical system of FIG. 1.

The second optical system of FIG. 3 is different from the second optical system of FIG. 2 in that light representing an object (object light OBJ2) is incident in the second direction that is not the same axis as that of the first direction of object light OBJ1 but the same direction as that of the first direction of object light OBJ1. That is, the second optical system that is a single focus super-wide angle optical system is used to photograph an object located in the same direction as that of the first optical system.

In the present embodiment, the switching between the first optical mode and the second optical mode is performed by the rotation of the second reflection member 73. For example, in the second optical mode, the second reflection member 73 pivots by 45° and thus the object light OBJ2 proceeds toward the photographing device 62. In contrast, in the first optical mode, the second reflection member 73 pivots to be close to the positive meniscus lens 72 and thus the object light OBJ1 is refracted by the first reflection member 12 to proceed toward the photographing device 62.

In the present embodiment, the focal length of the second optical system is shorter than the focal length of the first optical system in the wide mode. Thus, the optical zoom ratio in the embodiment in which both of the first and second optical systems are simultaneously employed may be larger than the embodiment in which only the first optical system that is a zoom lens optical system is employed. In particular, because of the above-described design of the first optical system and the sharing of the first optical system and the second optical system, a high optical zoom ratio may be obtained without increasing the volume of the overall optical system.

Figure 4:
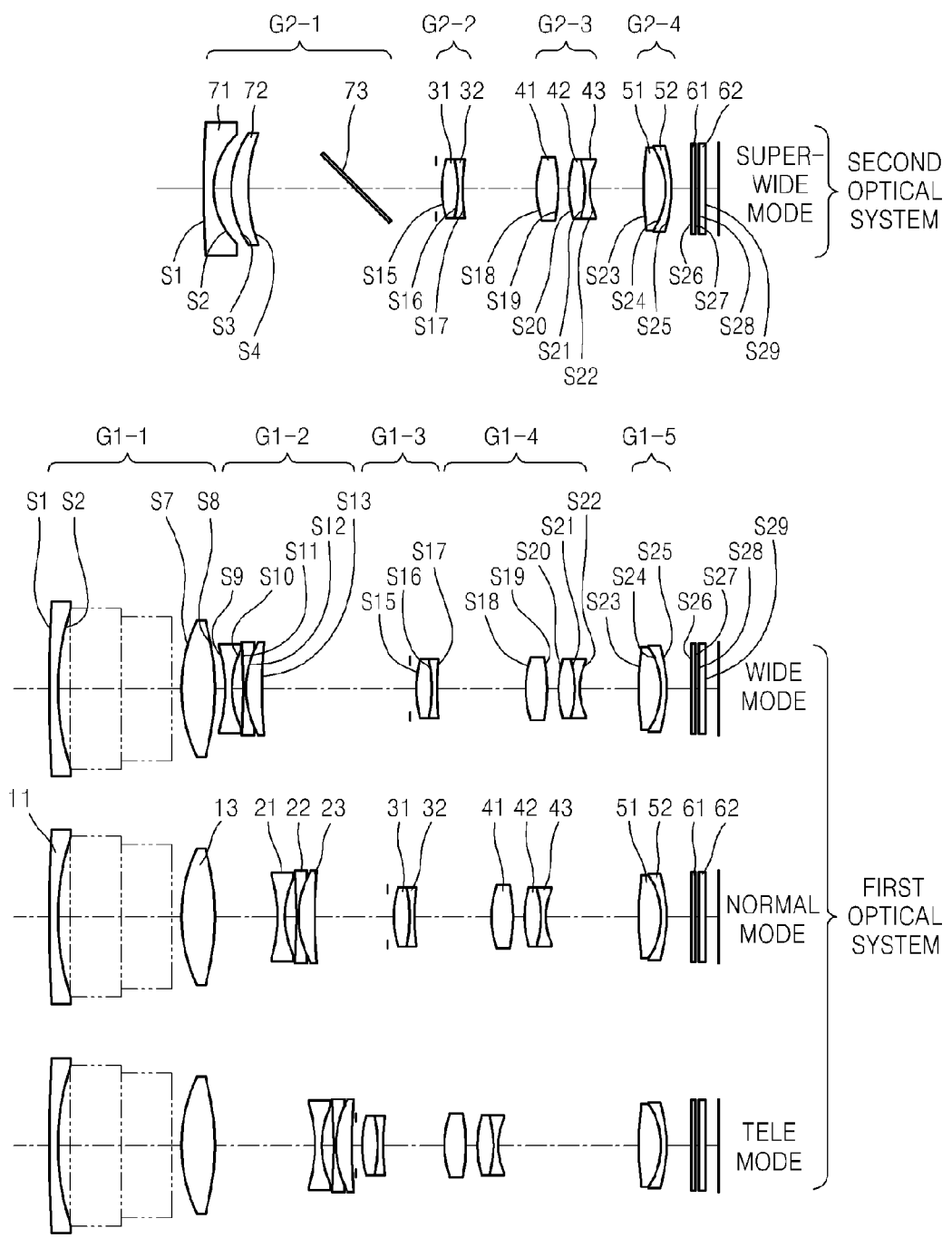
FIG. 4 schematically illustrates a dual lens optical system employing the first and second optical systems of FIGS. 1 and 2 according to an embodiment, for optical design simulation.
Figure 5:
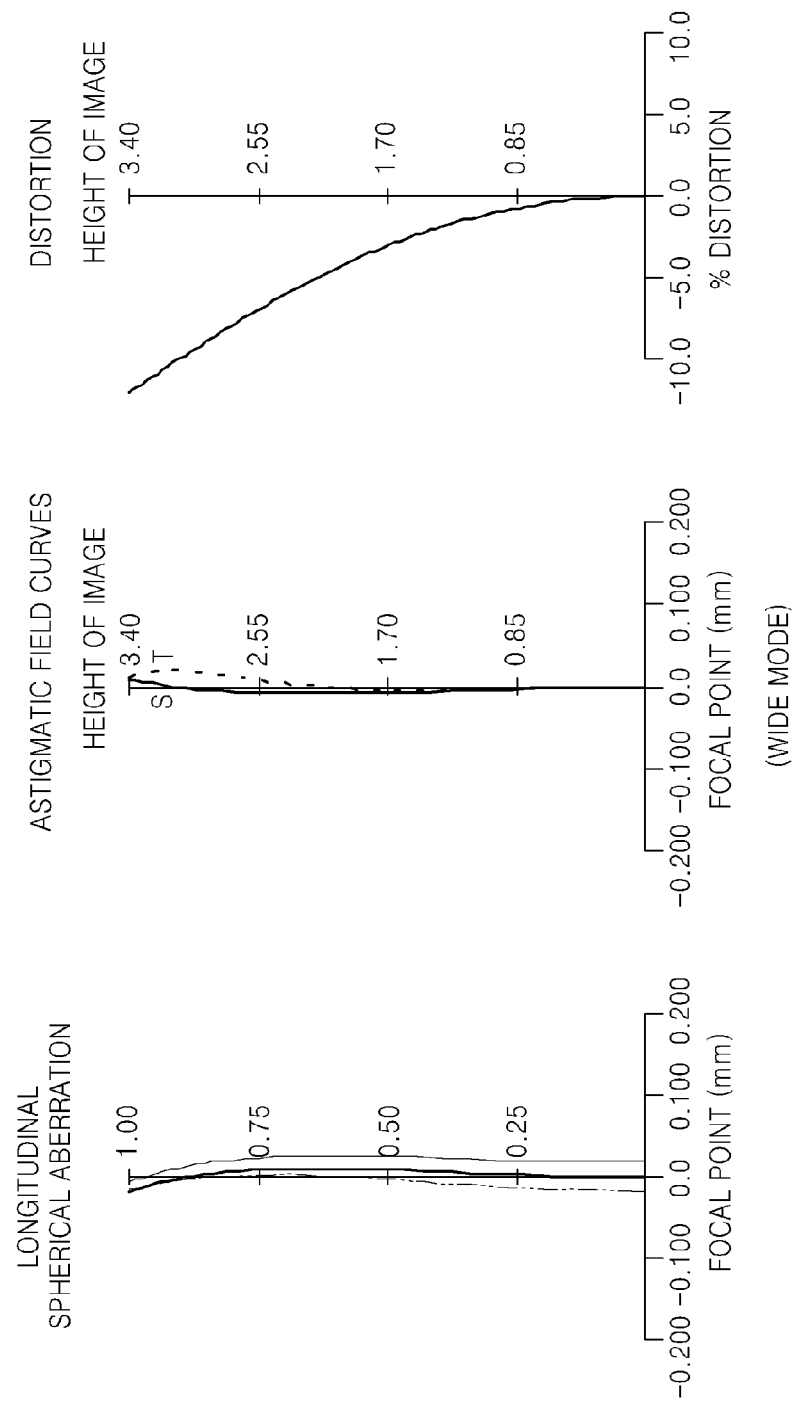
FIG. 5 illustrates the spherical aberration, astigmatic field curves, and distortion of the lens optical system of FIG. 4 in a wide mode.
Figure 6:
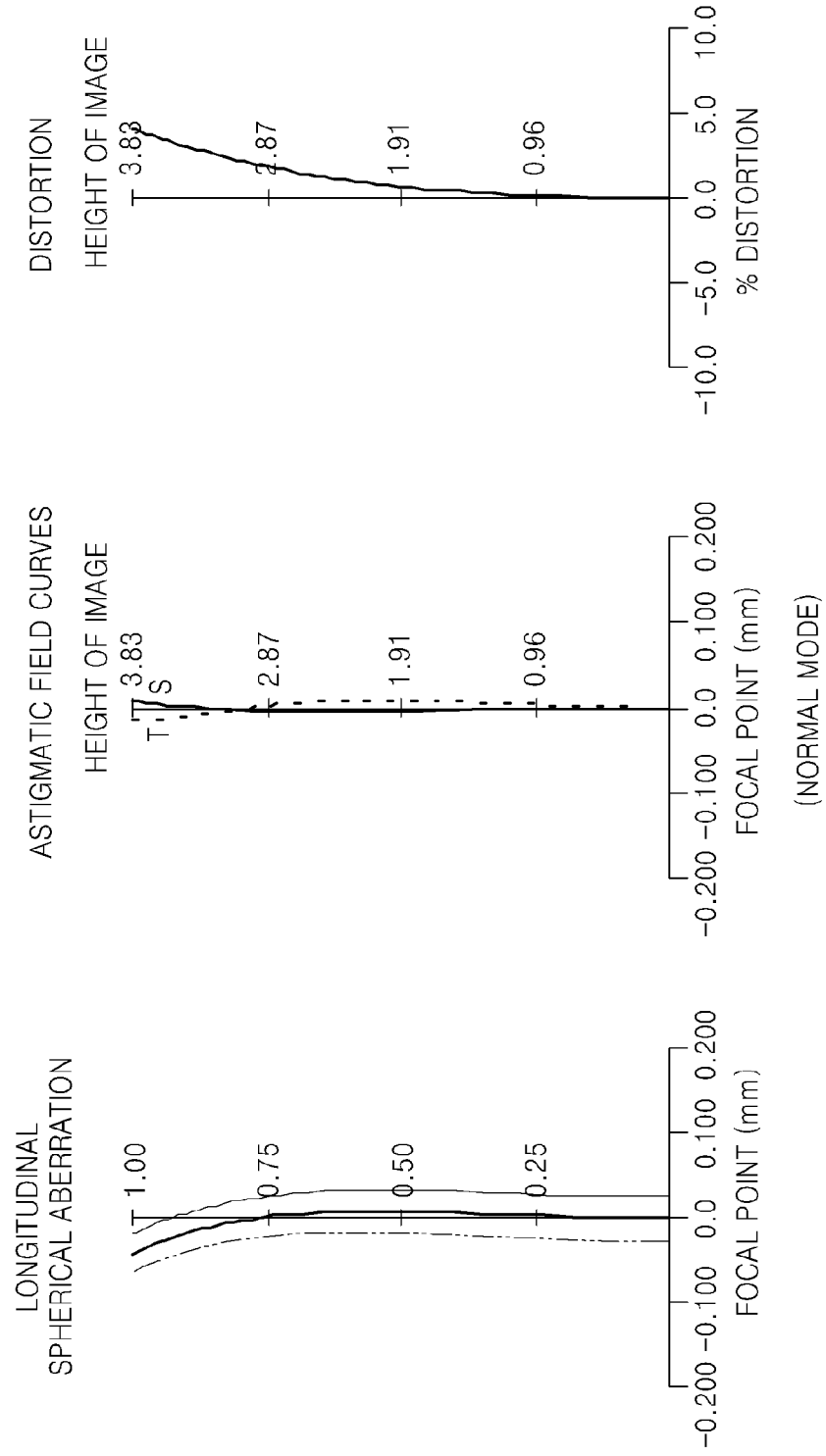
FIG. 6 illustrates the spherical aberration, astigmatic field curves, and distortion of the lens optical system of FIG. 4 in a normal mode.
Figure 7:
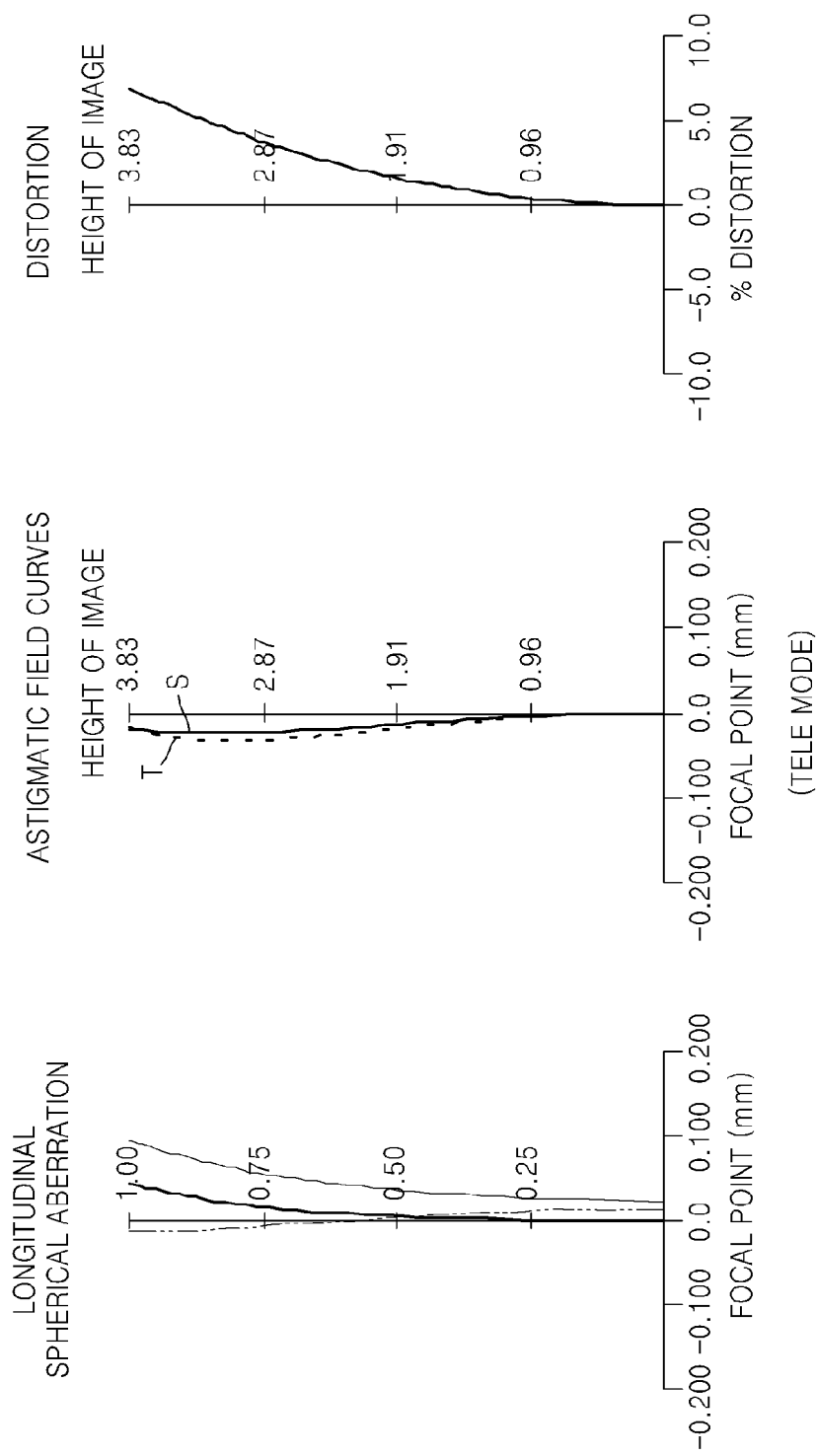
FIG. 7 illustrates the spherical aberration, astigmatic field curves, and distortion of the lens optical system of FIG. 4 in a tele mode.
Figure 8:
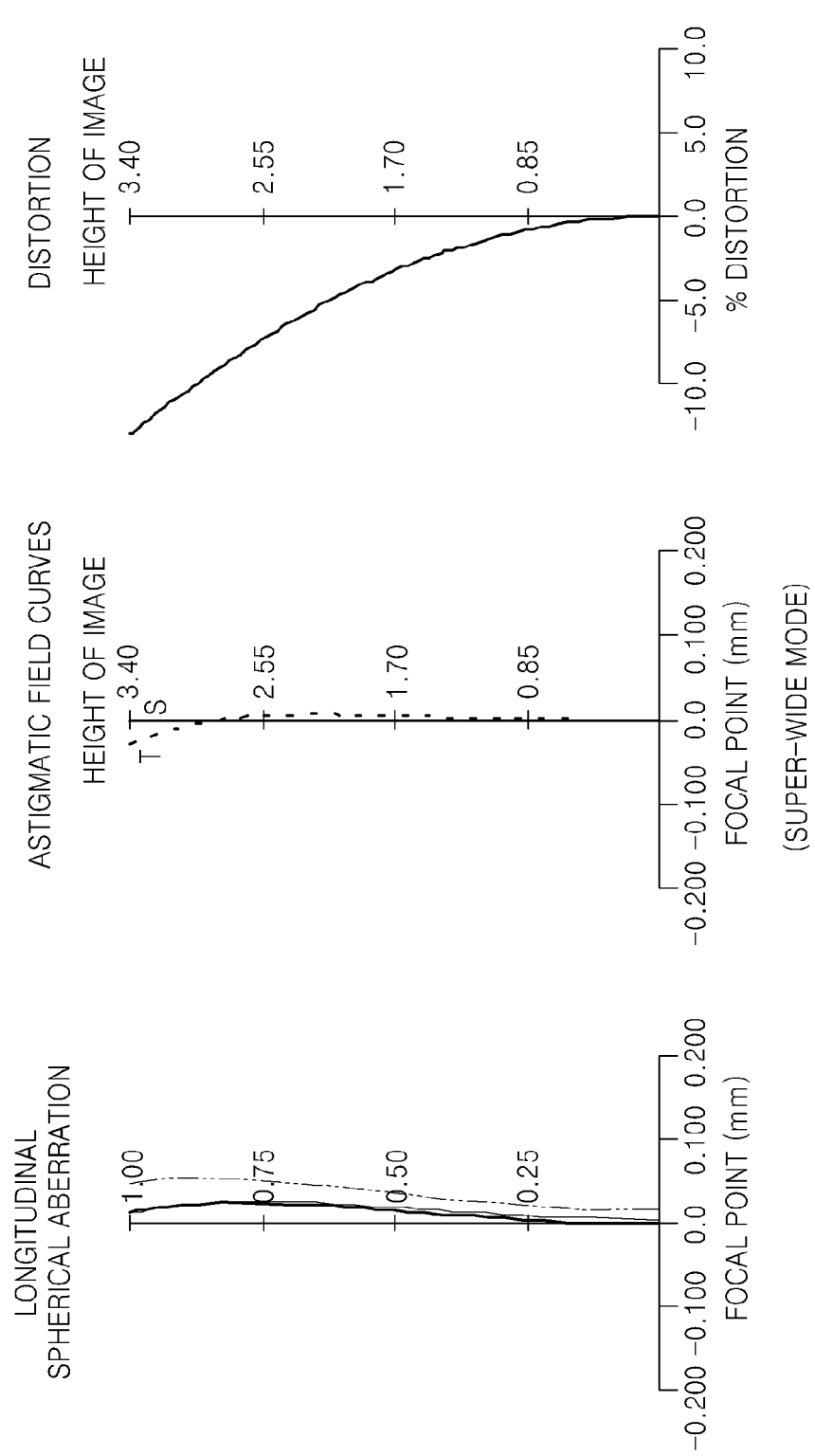
FIG. 8 illustrates the spherical aberration, astigmatic field curves, and distortion of the lens optical system of FIG. 4 in a super-wide mode.

FIG. 4 schematically illustrates a dual lens optical system employing the first and second optical systems of FIGS. 1 and 2 according to an embodiment, for optical design simulation. Thus, the descriptions about the embodiments of FIGS. 1 and 2 may be referred to for the descriptions about the first and second optical systems according to the embodiment of FIG. 4.

Table 1 shows design data of the first optical system of the embodiment of FIG. 4.

TABLE 1

| Lens Surface | R | D | Nd | Vd |
| --- | --- | --- | --- | --- |
| OBJ | INFINITY | INFINITY | | |
| S1 | 228.128 | 0.65 | 1.92286 | 20.88 |
| S2 | 21.884 | 1.23 | | |
| S3 | INFINITY | 4.288 | 1.834 | 37.34 |
| S4 | INFINITY | 0 | | |
| S5 | INFINITY | 4.288 | 1.834 | 37.34 |
| S6 | INFINITY | 0.5 | | |
| S7* | 14.126 | 2.613 | 1.62263 | 58.16 |
| S8* | −20.839 | D1 | | |
| S9* | −12.78 | 0.5 | 1.8061 | 40.73 |
| S10* | 8.897 | 0.806 | | |
| S11 | −173.968 | 0.4 | 1.59282 | 68.62 |
| S12 | 8.426 | 1.263 | 1.92286 | 20.88 |
| S13 | 38.047 | D2 | | |
| ST | INFINITY | 0.3 | | |
| S15* | 12.067 | 1.441 | 1.6935 | 53.2 |
| S16 | −6.275 | 0.4 | 1.62004 | 36.3 |
| S17 | 44.207 | D3 | | |
| S18* | 8.415 | 1.355 | 1.4971 | 81.56 |
| S19* | −15.793 | 1 | | |
| S20 | 20 | 1.339 | 1.497 | 81.61 |
| S21 | −18.187 | 0.4 | 1.62299 | 58.12 |
| S22 | 7.547 | D4 | | |
| S23 | 53.237 | 1.979 | 1.497 | 81.61 |
| S24 | −4.959 | 0.5 | 1.84666 | 23.78 |
| S25 | −12.974 | 2.039 | | |
| S26 | INFINITY | 0.3 | 1.5168 | 64.2 |
| S27 | INFINITY | 0.3 | | |
| S28 | INFINITY | 0.5 | 1.5168 | 64.2 |
| S29 | INFINITY | 1 | | |
| IMG | INFINITY | | | |

Table 2 shows design data of the second optical system of the embodiment of FIG. 4.

TABLE 2

| Lens Surface | R | D | Nd | Vd |
| --- | --- | --- | --- | --- |
| OBJ | INFINITY | INFINITY | | |
| S1* | 300 | 0.65 | 1.85135 | 40.1 |
| S2* | 5.729 | 1.585 | | |
| S3 | 8.3 | 1.265 | 1.92286 | 20.88 |
| S4 | 11.322 | 16.509 | | |
| ST | INFINITY | 0.3 | | |
| S15 | 12.067 | 1.441 | 1.6935 | 53.2 |
| S16 | −6.275 | 0.4 | 1.62004 | 36.3 |
| S17 | 44.207 | D3 | | |
| S18 | 8.415 | 1.355 | 1.4971 | 81.56 |
| S19 | −15.793 | 1 | | |
| S20 | 20 | 1.339 | 1.497 | 81.61 |
| S21 | −18.187 | 0.4 | 1.62299 | 58.12 |
| S22 | 7.547 | D4 | | |
| S23 | 53.237 | 1.979 | 1.497 | 81.61 |
| S24 | −4.959 | 0.5 | 1.84666 | 23.78 |
| S25 | −12.974 | 2.039 | | |
| S26 | INFINITY | 0.3 | 1.5168 | 64.2 |
| S27 | INFINITY | 0.3 | | |
| S28 | INFINITY | 0.5 | 1.5168 | 64.2 |
| S29 | INFINITY | 1 | | |
| IMG | INFINITY | | | |

In Table 2, "R" denotes the radius of curvature, "D" denotes the thickness of a lens at the central portion thereof or the distance between the lenses, "Nd" denotes the refractive index of a material, "Vd" denotes the Abbe's number of the material, and the mark "*" in the lens surface column denotes an aspherical surface.

The lens optical system of FIG. 4 can correct spherical aberration by including at least one aspherical lens. The definition of the aspherical surface is as follows.

Assuming that the optical axis direction facing the photographing device is an x-axis, the direction perpendicular to the optical axis, that is, the direction in which object light is input through the incident lens, is a y-axis, and that a direction in which a light ray proceeds is set to be positive, the shape of an aspherical surface may be expressed by Equation 1.

$$x = \frac{c'y^2}{1+\sqrt{1-(K+1)c'^2y^2}} + Ay^4 + By^6 + Cy^8 + Dy^{10} \quad [\text{Equation 1}]$$

In Equation 1, "x" denotes the distance from the apex of the lens in the optical axis direction, "y" denotes the distance in a direction perpendicular to the optical axis, "K" denotes a conic constant, "A", "B", "C", and "D" denote aspherical coefficients, and "c'" denotes the reciprocal (1/R) of the radius of curvature at the apex of the lens.

Table 3 shows the aspherical coefficients in the lens optical system according to the embodiment of FIG. 4.

TABLE 3

| | Lens Surface | K | A | B | C | D |
|---|---|---|---|---|---|---|
| First optical system | S7 | −1.038536 | −1.3645E−05 | 2.0307E−07 | 3.7586E−09 | 0.0000E+00 |
| | S8 | −0.896036 | 2.9476E−05 | 2.9855E−07 | 7.0432E−10 | 0.0000E+00 |
| | S9 | −3.732583 | −1.6788E−04 | 1.6472E−05 | −5.3664E−07 | 9.3474E−09 |
| | S10 | −0.409968 | −2.1747E−04 | 1.6473E−05 | 0.0000E+00 | 0.0000E+00 |
| | S15 | −1.313189 | −1.0615E−04 | 0.0000E+00 | 0.0000E+00 | 0.0000E+00 |
| | S18 | −0.377995 | −1.2554E−04 | 0.0000E+00 | 0.0000E+00 | 0.0000E+00 |
| | S19 | −1.603021 | 1.8967E−04 | −3.1119E−06 | 0.0000E+00 | 0.0000E+00 |
| Second optical system | S1 | −1 | 0.00E+00 | 0.00E+00 | 0.00E+00 | 0.00E+00 |
| | S2 | −1 | 4.00E−04 | 3.42E−06 | 0.00E+00 | 0.00E+00 |

Table 4 shows data of variable distances during zooming in the lens optical system according to the embodiment of FIG. 4.

TABLE 4

| | Wide angle mode | Normal mode 1 | Normal mode 2 | Normal mode 3 | Tele mode | Super-wide mode |
|---|---|---|---|---|---|---|
| EFL | 6.0601 | 8.4842 | 12.4314 | 19.9121 | 28.4827 | 5.2 |
| 2ω | 65.03 | 49.02 | 32.97 | 20.51 | 14.33 | 73.77 |
| Fno | 3.6054 | 3.8621 | 4.1991 | 4.6243 | 4.7719 | 3.3952 |
| D1 | 1 | 3.13 | 5.294 | 7.841 | 9.893 | — |
| D2 | 12.7 | 9.514 | 6.4 | 3.1 | 0.5 | — |
| D3 | 5.932 | 5.458 | 4.448 | 2.953 | 2.759 | 5.835 |
| D4 | 4.966 | 6.501 | 8.462 | 10.696 | 11.437 | 3.772 |

In Table 4, "EFL" denotes the effective focal length of the overall lens system, "Fno" denotes the F number, "2ω" denotes the full viewing angle, "D1" denotes the distance between the first lens group G1-1 and the second lens group G1-2, "D2" denotes the distance between the second lens group G1-2 and the aperture ST adjacent to the third lens group G1-3, "D3" denotes the distance between the third lens group G1-3 and the fourth lens group G1-4, and "D4" denotes the distance between the fourth lens group G1-4 and the fifth lens group G1-5.

FIGS. 5-8 illustrate the spherical aberration, astigmatic field curves, and distortion of the lens optical system of FIG. 4 in the wide mode, the normal mode, the tele mode, and the super-wide mode, respectively. The astigmatism field curves may be referred to as astigmatism.

The value of "|dT/f2|" in Inequality 1 in the lens optical system of FIG. 4, that is, the ratio of the interval between the first lens group G1-1 and the second lens group G1-2 in the tele mode with respect to the focal length of the second lens group is 1.42, which satisfies the conditions of Inequality 1.

Figure 9:
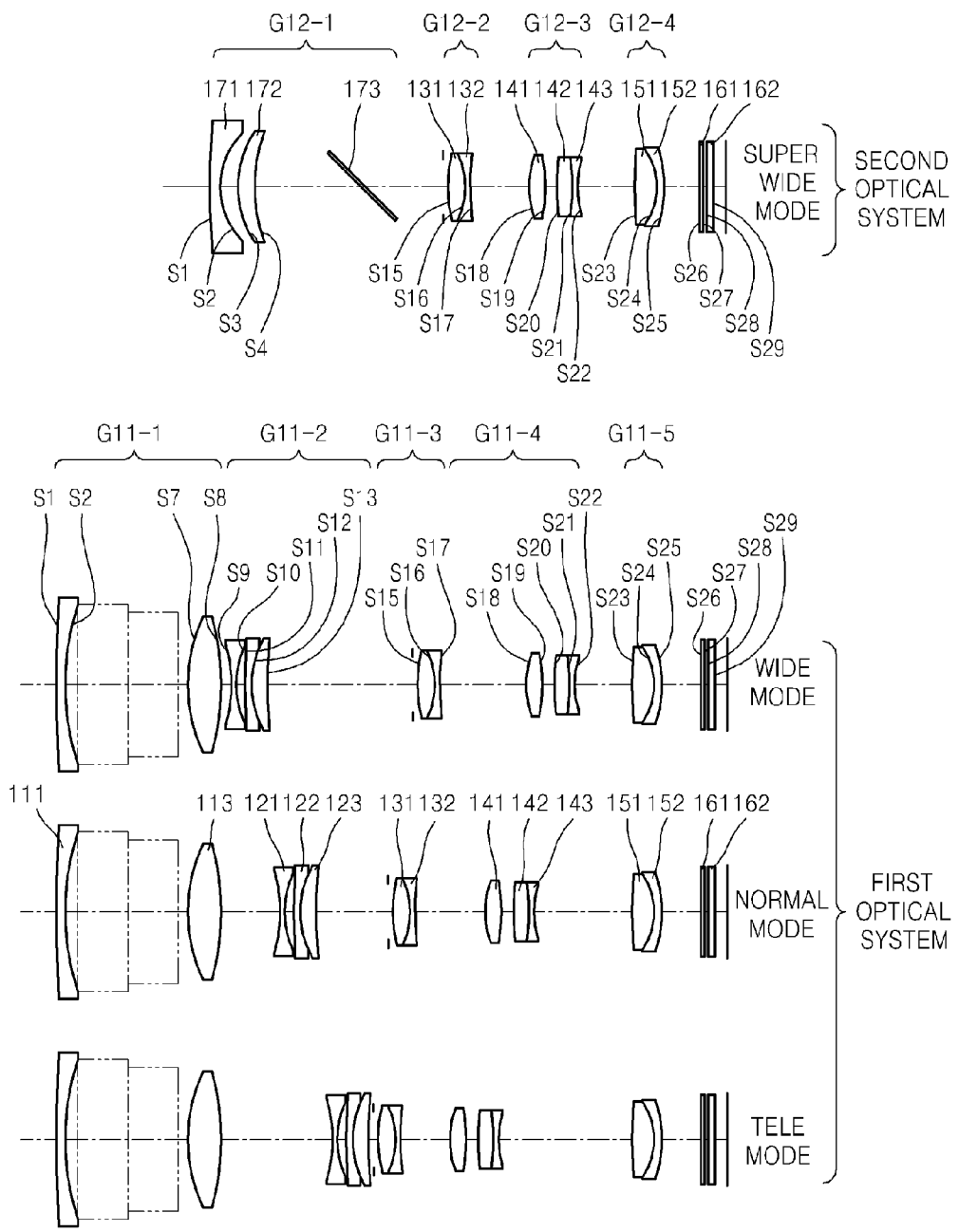
FIG. 9 schematically illustrates a dual lens optical system according to a modified example of the embodiment of FIG. 4, for optical design simulation.
Figure 10:
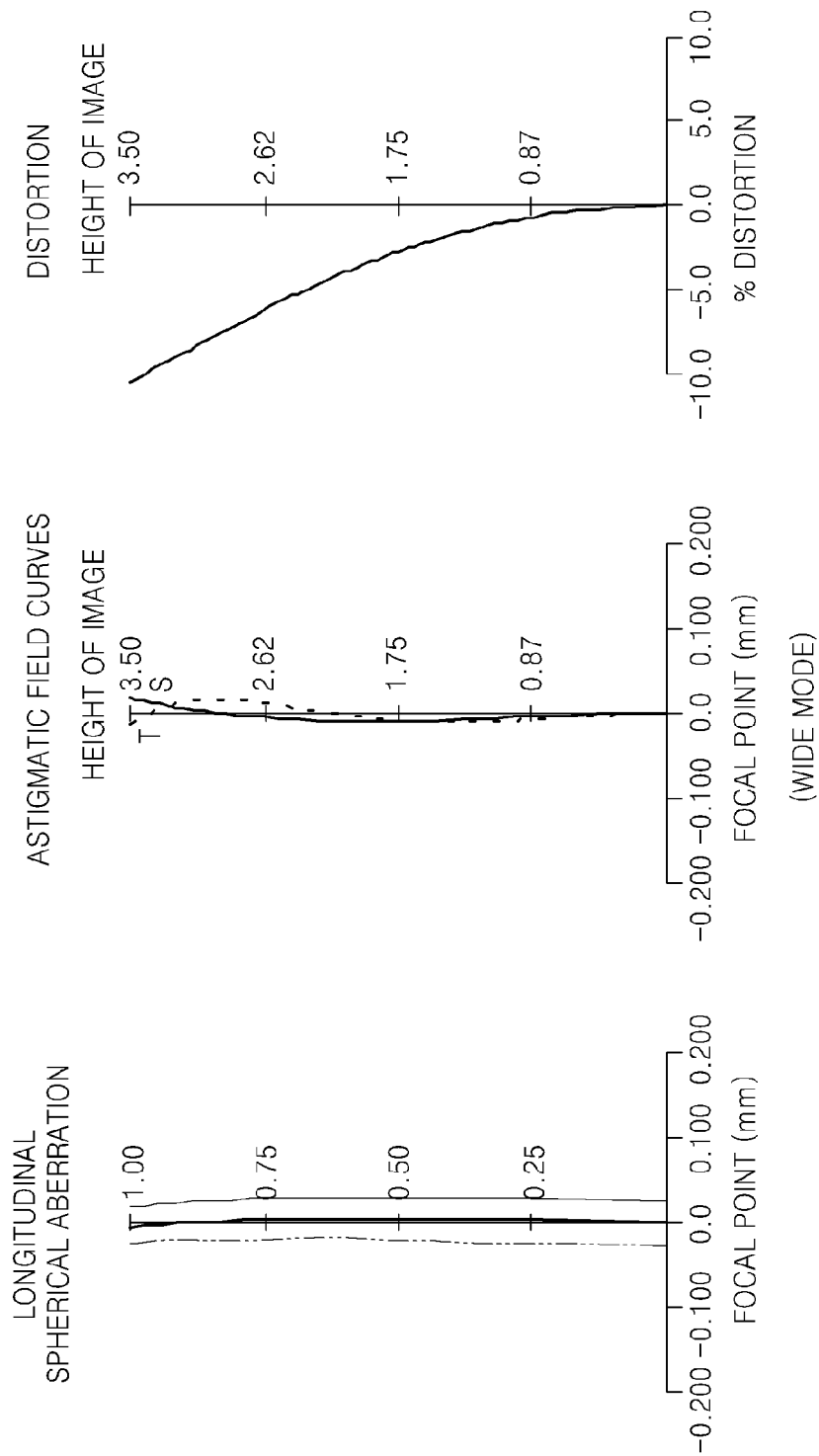
FIG. 10 illustrates the spherical aberration, astigmatic field curves, and distortion of the lens optical system of FIG. 9 in a wide mode.
Figure 11:
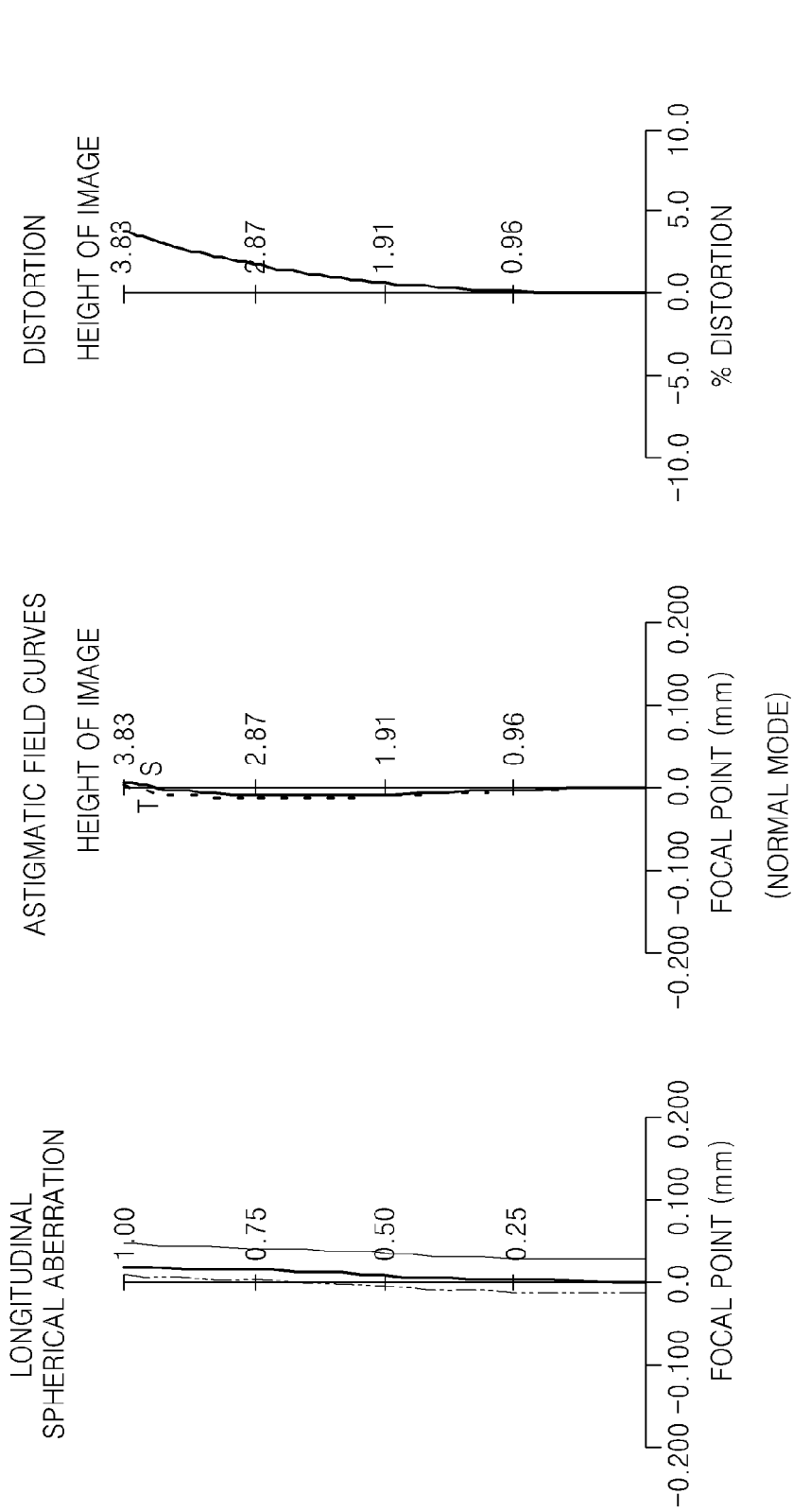
FIG. 11 illustrates the spherical aberration, astigmatic field curves, and distortion of the lens optical system of FIG. 9 in a normal mode.
Figure 12:
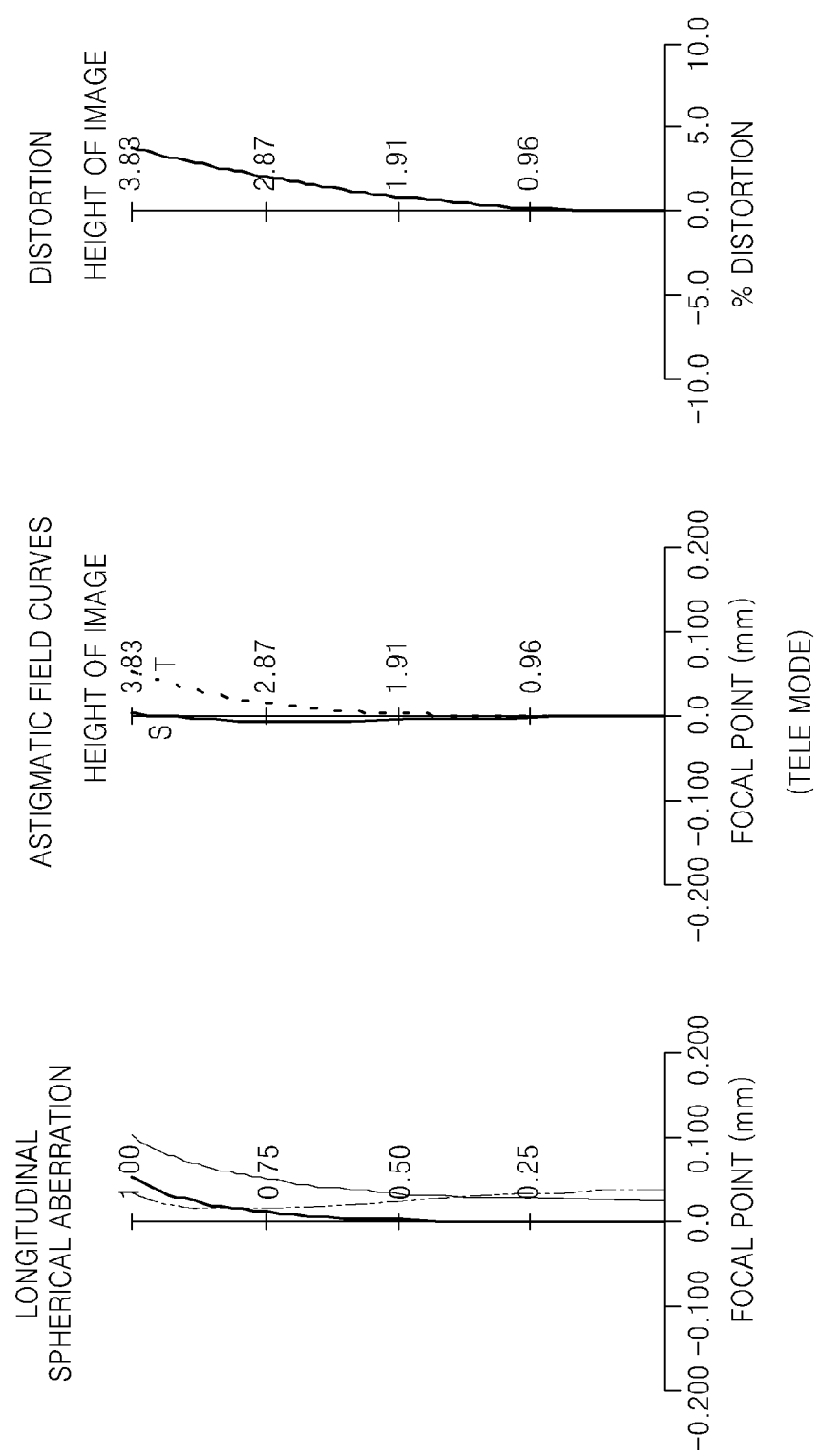
FIG. 12 illustrates the spherical aberration, astigmatic field curves, and distortion of the lens optical system of FIG. 9 in a tele mode.
Figure 13:
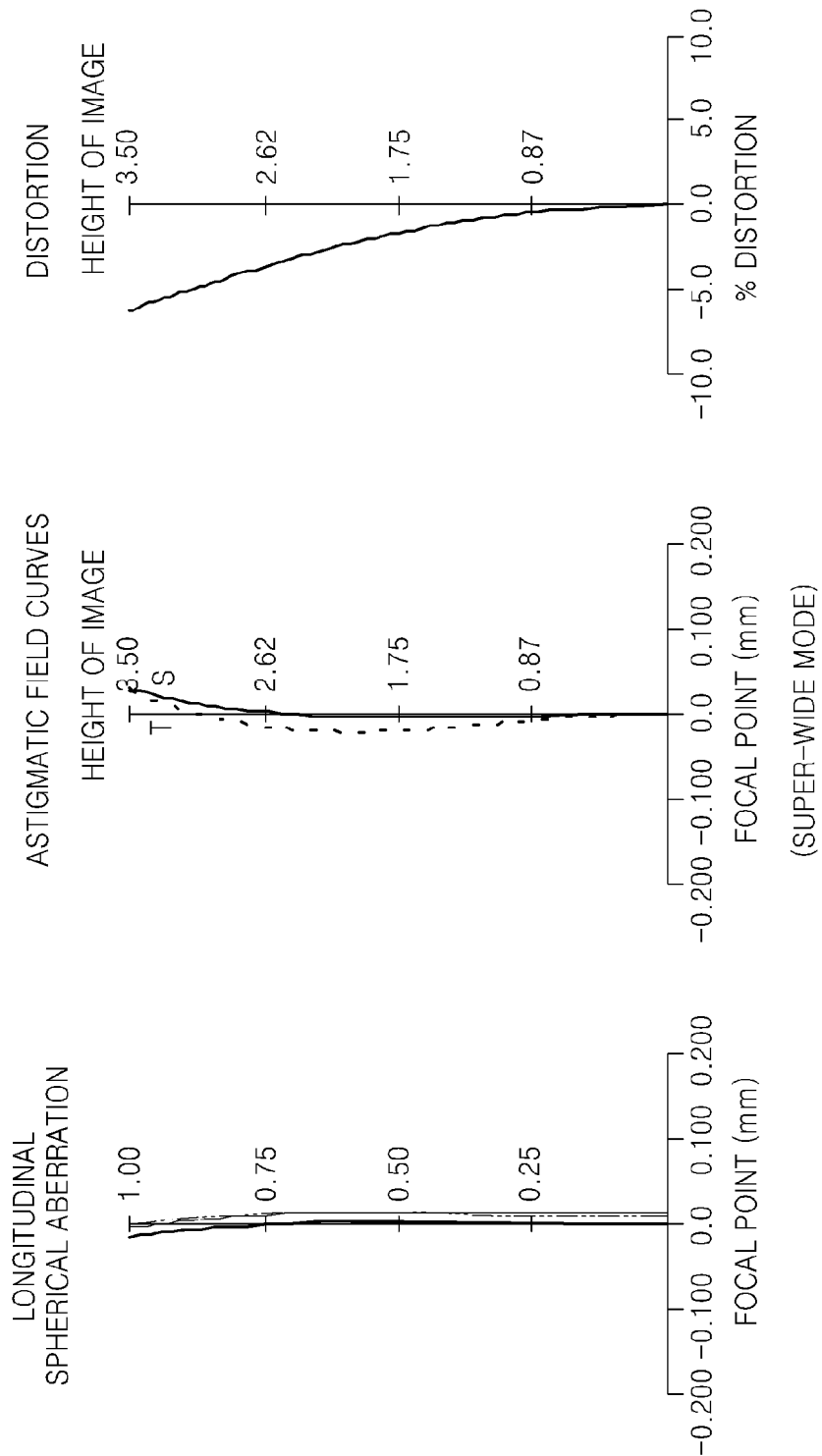
FIG. 13 illustrates the spherical aberration, astigmatic field curves, and distortion of the lens optical system of FIG. 9 in a super-wide mode.

FIG. 9 schematically illustrates a dual lens optical system according to a modified example of the embodiment of FIG. 4, for optical design simulation. Referring to FIG. 9, a first lens group G11-1, a third lens group G11-3, and a fifth lens group G11-5 of a first optical system according to the present embodiment are substantially similar to the first lens group G1-1, the third lens group G1-3, and the fifth lens group G1-5 of the first optical system of FIG. 4.

A second lens 122 from the object side of the second lens group G11-2 of the first optical system according to the present embodiment is a negative meniscus lens, unlike the second lens group G1-2 of the first optical system of FIG. 4. A lens 141 closest to the object side of the fourth lens group G11-4 of the first optical system according to the present embodiment is a positive meniscus lens, unlike the fourth lens group G1-4 of the first optical system of FIG. 4.

Table 5 shows design data of the first optical system of the embodiment of FIG. 9.

TABLE 5

| Lens Surface | R | D | Nd | Vd |
|---|---|---|---|---|
| OBJ | INFINITY | INFINITY | | |
| S1 | 361.59 | 0.65 | 1.92286 | 20.88 |
| S2 | 21.33 | 1.104 | | |
| S3 | INFINITY | 4.299 | 1.834 | 37.34 |
| S4 | INFINITY | 0 | | |
| S5 | INFINITY | 4.299 | 1.834 | 37.34 |
| S6 | INFINITY | 0.5 | | |
| S7* | 13.547 | 2.733 | 1.62263 | 58.16 |
| S8* | −19.277 | D1 | | |
| S9* | −12.515 | 0.5 | 1.8061 | 40.73 |
| S10* | 7.651 | 0.831 | | |
| S11 | 356.775 | 0.4 | 1.59282 | 68.62 |
| S12 | 8.79 | 1.295 | 1.92286 | 20.88 |
| S13 | 73.998 | D2 | | |
| ST | INFINITY | 0.3 | | |
| S15* | 7.011 | 1.41 | 1.62263 | 58.16 |
| S16 | −11.405 | 0.4 | 1.70154 | 41.15 |
| S17 | 16.639 | D3 | | |

TABLE 5-continued

| Lens Surface | R | D | Nd | Vd |
|---|---|---|---|---|
| S18* | 6.847 | 1.863 | 1.58313 | 59.46 |
| S19* | −15.12 | 1 | | |
| S20 | 9.599 | 1.36 | 1.497 | 81.61 |
| S21 | −8.193 | 0.4 | 1.72342 | 37.99 |
| S22 | 5.052 | D4 | | |
| S23 | −97.178 | 1.63 | 1.497 | 81.61 |

TABLE 5-continued

| Lens Surface | R | D | Nd | Vd |
|---|---|---|---|---|
| S24 | −6.744 | 0.5 | 1.84666 | 23.78 |
| S25 | −11.209 | 1 | | |
| S26 | INFINITY | 0.3 | 1.5168 | 64.2 |
| S27 | INFINITY | 0.3 | | |
| S28 | INFINITY | 0.5 | 1.5168 | 64.2 |
| S29 | INFINITY | 1 | | |
| IMG | INFINITY | | | |

Table 6 shows design data of the second optical system of the embodiment of FIG. 9.

TABLE 6

| Lens Surface | R | D | Nd | Vd |
|---|---|---|---|---|
| OBJ | INFINITY | INFINITY | | |
| S1* | 300 | 0.65 | 1.85135 | 40.1 |
| S2* | 5.517 | 1.56 | | |
| S3 | 8.3 | 1.29 | 1.92286 | 20.88 |
| S4 | 11.473 | 16.16 | | |
| ST | INFINITY | 0.3 | | |
| S15 | 7.011 | 1.41 | 1.62263 | 58.16 |
| S16 | −11.405 | 0.4 | 1.70154 | 41.15 |
| S17 | 16.639 | D3 | | |
| S18 | 6.847 | 1.863 | 1.58313 | 59.46 |
| S19 | −15.12 | 1 | | |
| S20 | 9.599 | 1.36 | 1.497 | 81.61 |
| S21 | −8.193 | 0.4 | 1.72342 | 37.99 |
| S22 | 5.052 | D4 | | |
| S23 | −97.178 | 1.63 | 1.497 | 81.61 |
| S24 | −6.744 | 0.5 | 1.84666 | 23.78 |
| S25 | −11.209 | 1 | | |
| S26 | INFINITY | 0.3 | 1.5168 | 64.2 |
| S27 | INFINITY | 0.3 | | |
| S28 | INFINITY | 0.5 | 1.5168 | 64.2 |
| S29 | INFINITY | 1 | | |
| IMG | INFINITY | | | |

In Table 6, "R" denotes the radius of curvature, "D" denotes the thickness of a lens at the central portion thereof or the distance between the lenses, "Nd" denotes the refractive index of a material, "Vd" denotes the Abbe's number of the material, and the mark "*" in the lens surface column denotes an aspherical surface.

The lens optical system of FIG. 9 may correct spherical aberration by including at least one aspherical lens. Since the definition of the aspherical surface is the same as that described above, a description thereof will be omitted herein.

Table 7 shows aspherical surface coefficients in the lens optical system according to the embodiment of FIG. 9.

TABLE 7

| | Lens Surface | K | A | B | C | D |
|---|---|---|---|---|---|---|
| First optical system | S7 | −0.998523 | −8.43E−06 | 9.61E−08 | 3.38E−09 | 0.00E+00 |
| | S8 | −4.003909 | −2.48E−06 | 2.91E−07 | 0.00E+00 | 0.00E+00 |
| | S9 | −1.977535 | −5.59E−05 | 9.82E−06 | −1.46E−07 | −1.09E−10 |
| | S10 | −2.647565 | 2.49E−04 | 4.35E−06 | 2.04E−07 | 0.00E+00 |
| | S15 | −1.873766 | 4.65E−04 | 0.00E+00 | 0.00E+00 | 0.00E+00 |
| | S18 | −0.44464 | −1.27E−04 | 4.97E−06 | 1.92E−07 | 0.00E+00 |
| | S19 | 2.494991 | 6.09E−04 | 3.71E−06 | −4.38E−07 | 3.77E−08 |
| Second optical system | S1 | −1 | 0.00E+00 | 0.00E+00 | 0.00E+00 | 0.00E+00 |
| | S2 | −1 | 2.38E−04 | 1.75E−06 | 0.00E+00 | 0.00E+00 |

Table 8 shows data of variable distances during zooming in the lens optical system according to the embodiment of FIG. 9.

TABLE 8

| | Wide angle mode | Normal mode 1 | Normal mode 2 | Normal mode 3 | Tele mode | Super-wide mode |
|---|---|---|---|---|---|---|
| EFL | 5.9995 | 8.6297 | 12.7902 | 19.798 | 28.1976 | 5.1996 |
| 2ω | 66.11 | 47.60 | 32.15 | 21.10 | 14.90 | 71.34 |
| Fno | 3.538 | 3.8221 | 4.1835 | 4.8103 | 5.1667 | 3.4373 |
| D1 | 1 | 3.301 | 5.43 | 7 | 8.593 | — |
| D2 | 12.7 | 9.5 | 6.4 | 3.1 | 0.5 | — |
| D3 | 5.076 | 4.66 | 4.045 | 3.204 | 2.8 | 6.217 |
| D4 | 5.263 | 6.573 | 8.155 | 10.725 | 12.137 | 4.657 |

In Table 8, "EFL" denotes the synthetic focal length of the overall lens system, "Fno" denotes the F number, "2ω" denotes the full viewing angle, "D1" denotes the distance between the first lens group G11-1 and the second lens group G11-2, "D2" denotes the distance between the second lens group G11-2 and the aperture ST adjacent to the third lens group G11-3, "D3" denotes the distance between the third lens group G11-3 and the fourth lens group G11-4, and "D4" denotes the distance between the fourth lens group G11-4 and the fifth lens group G11-5.

Although in FIG. 9 a dual lens optical system including both of the first and second optical systems is described, the scope of the invention is not limited thereto. For example, the lens optical system may be formed of only the first optical system that is the zoom lens optical system of FIG. 9. Also, as another example, a lens optical system in which the second direction in which an incident lens 171 of the first lens group G12-1 of the second optical system of FIG. 9 faces matches the first direction in which an incident lens 111 of the first lens group G11-1 of FIG. 9 faces, as illustrated in FIG. 3, may be provided.

FIGS. 10-13 illustrate the spherical aberration, astigmatic field curves, and distortion of the lens optical system of FIG. 9 in the wide mode, the normal mode, the tele mode, and the super-wide mode, respectively. In the lens optical system of FIG. 9, the value of "|dT/f2|" in Inequality 1, that is, the ratio of the interval between the first lens group G11-1 and the second lens group G11-2 in the tele mode with respect to the focal length of the second lens group G11-2 is 1.21, which satisfies the conditions of Inequality 1.

Figure 14:
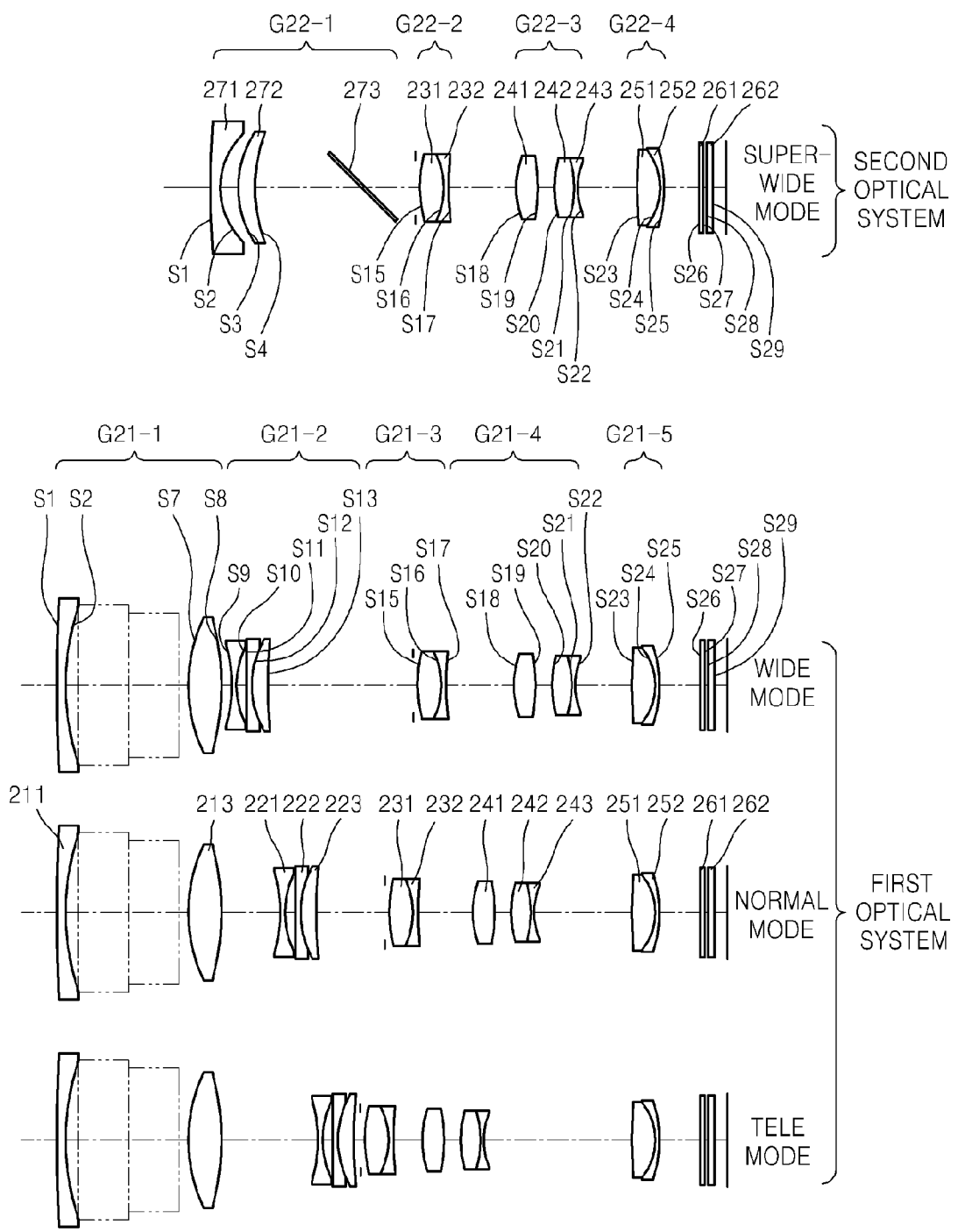
FIG. 14 schematically illustrates a dual lens optical system according to another modified example of the embodiment of FIG. 4, for optical design simulation.
Figure 15:
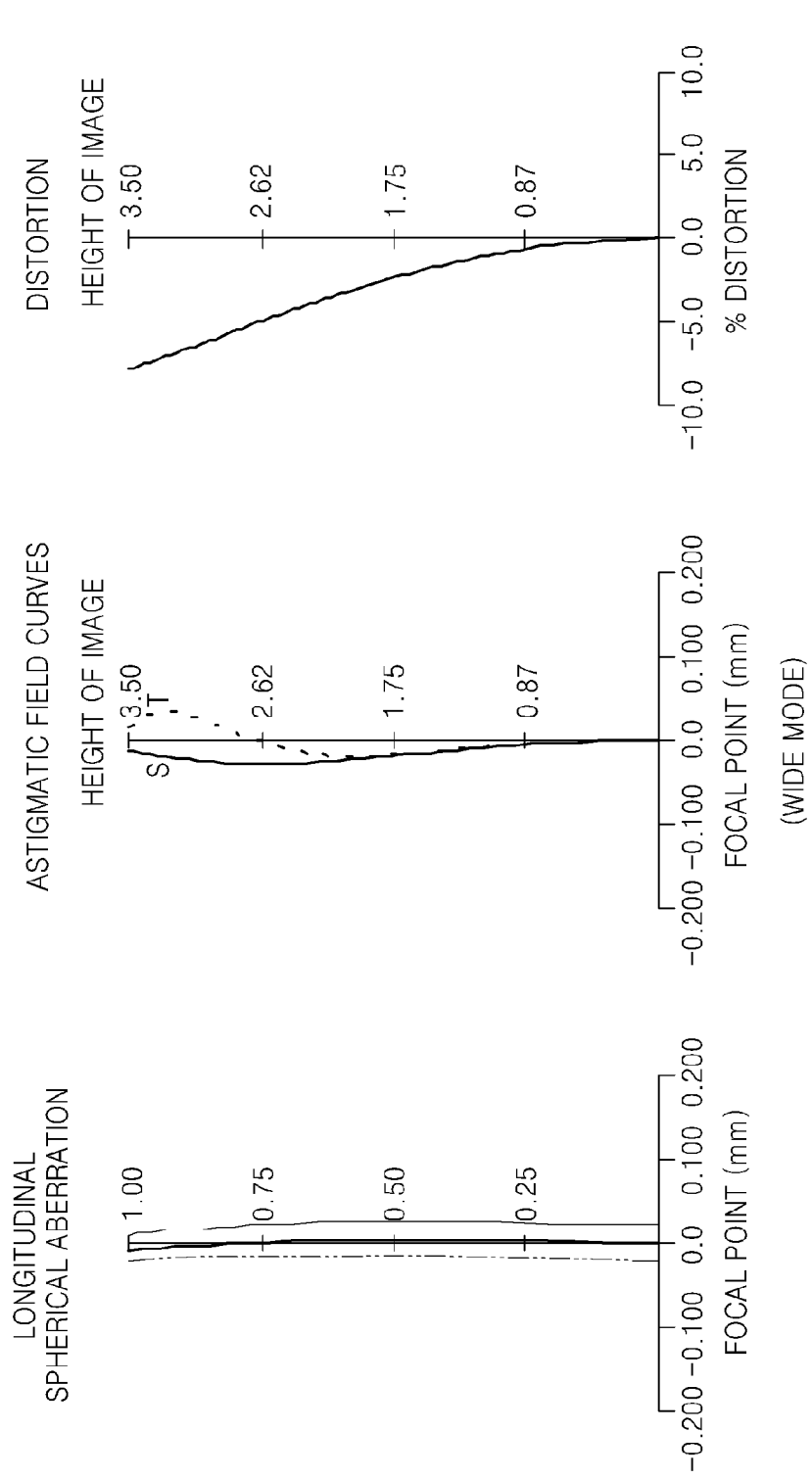
FIG. 15 illustrates the spherical aberration, astigmatic field curves, and distortion of the lens optical system of FIG. 14 in a wide mode.
Figure 16:
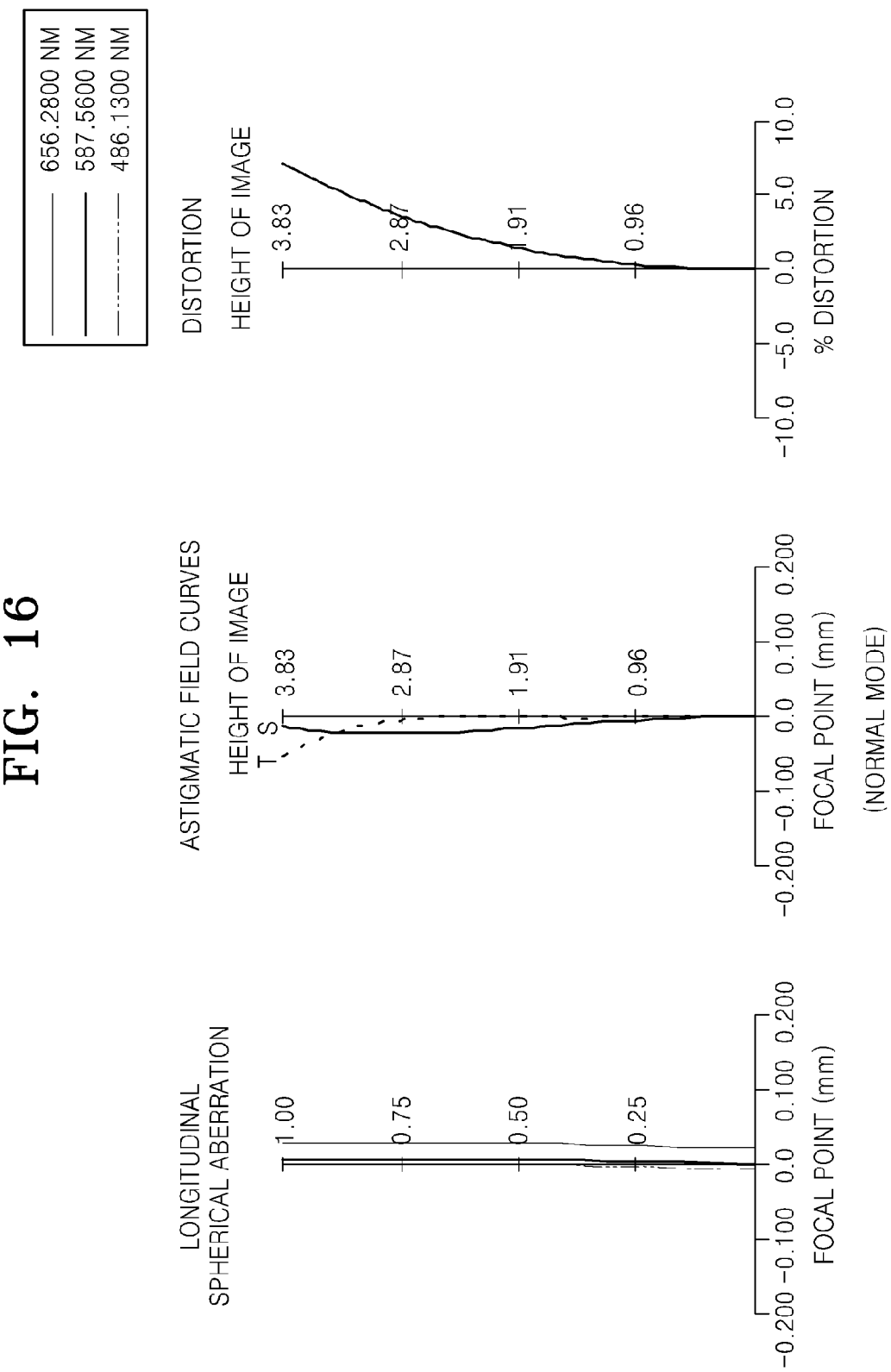
FIG. 16 illustrates the spherical aberration, astigmatic field curves, and distortion of the lens optical system of FIG. 14 in a normal mode.
Figure 17:
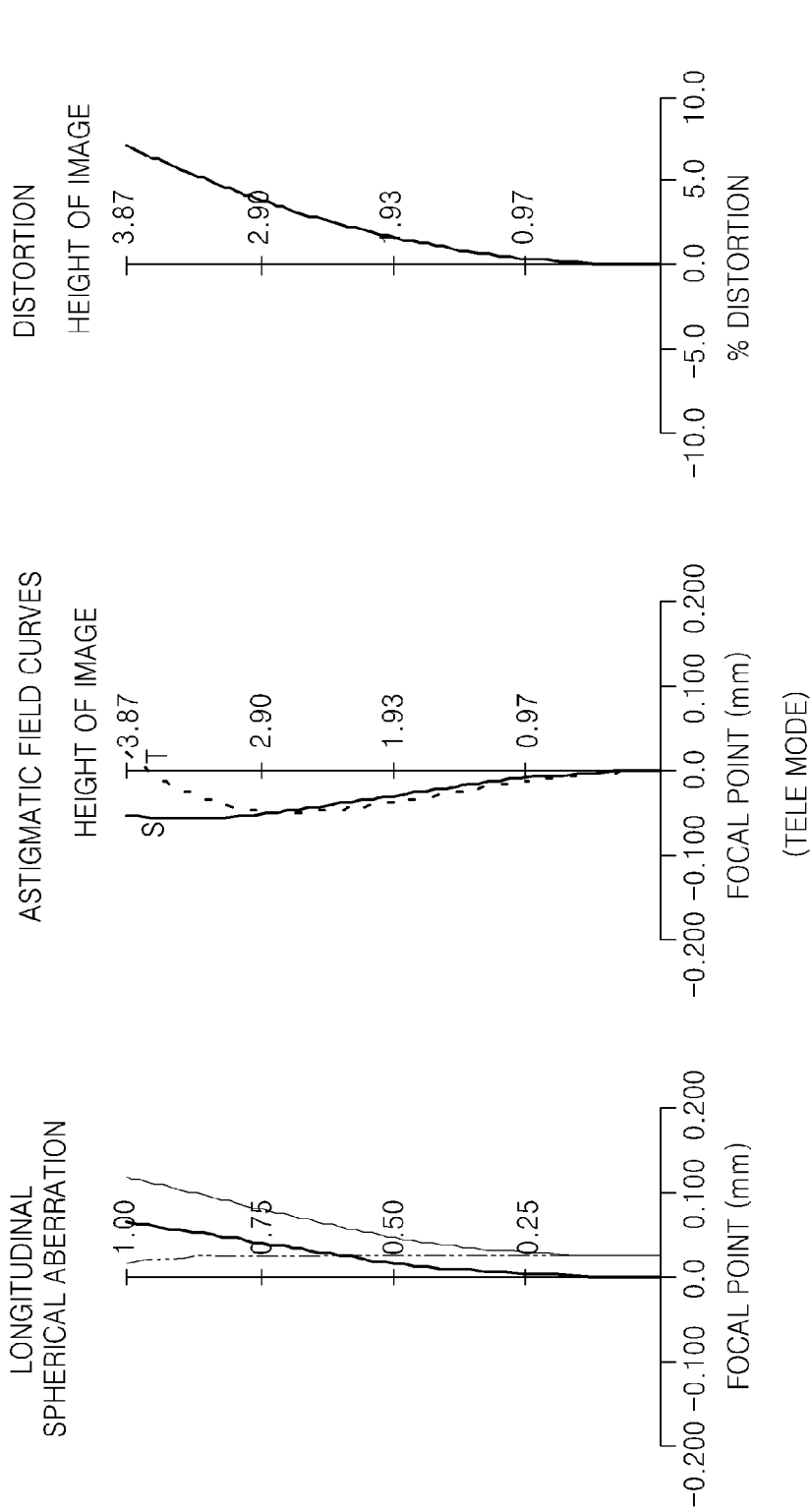
FIG. 17 illustrates the spherical aberration, astigmatic field curves, and distortion of the lens optical system of FIG. 14 in a tele mode.
Figure 18:
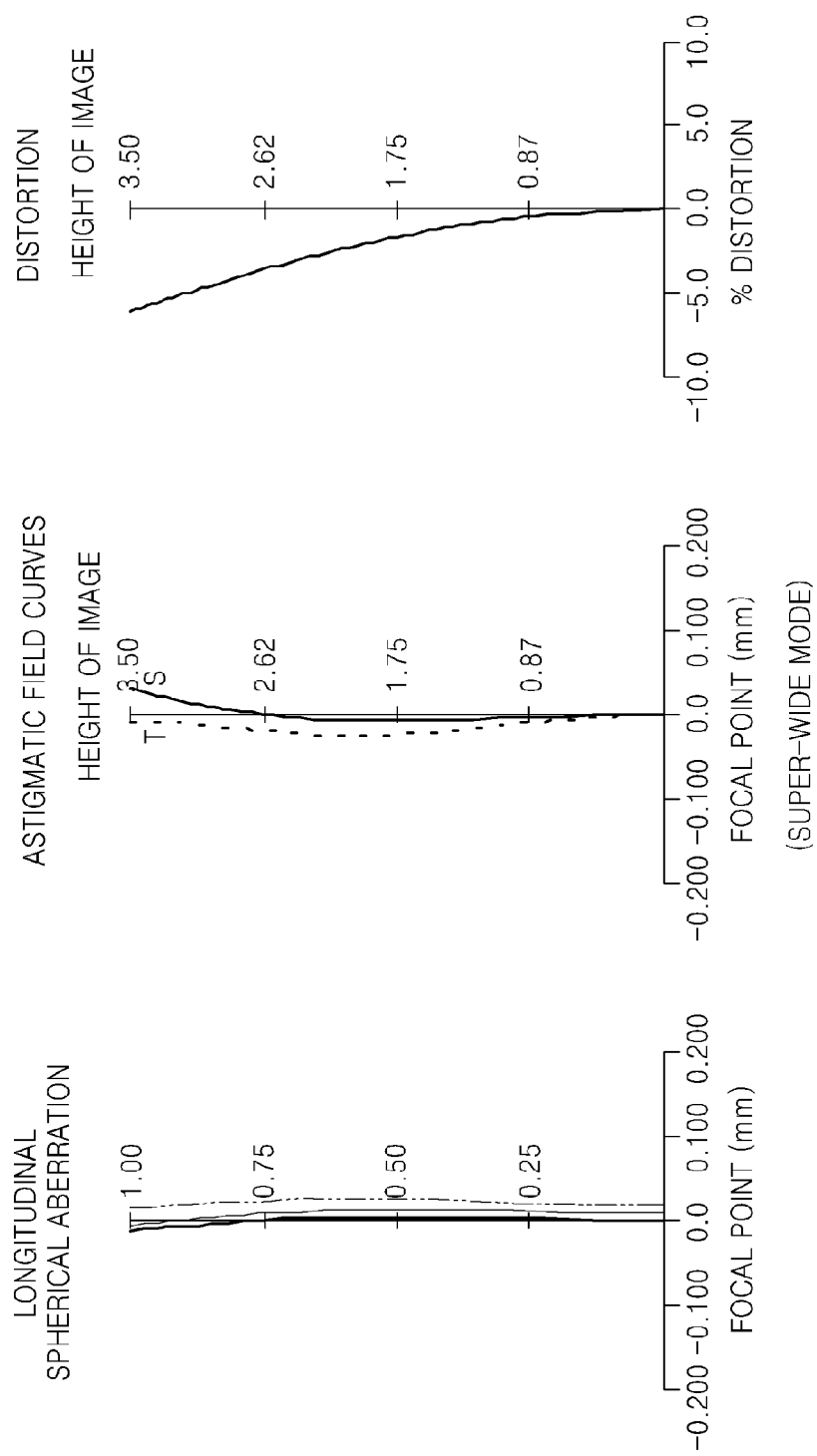
FIG. 18 illustrates the spherical aberration, astigmatic field curves, and distortion of the lens optical system of FIG. 14 in a super-wide mode.

FIG. 14 schematically illustrates a dual lens optical system according to another modified example of the embodiment of FIG. 4, for optical design simulation. Referring to FIG. 14, a first lens group G21-1 through a fifth lens group G21-5 of a first optical system according to the present embodiment are substantially similar to the first lens group G1-1 through the fifth lens group G1-5 of the first optical system of FIG. 4, and the following design data may be referred to for the difference in the optical design data therebetween.

Table 9 shows design data of the first optical system of the embodiment of FIG. 14.

TABLE 9

| Lens Surface | R | D | Nd | Vd |
|---|---|---|---|---|
| OBJ | INFINITY | | | |
| S1 | 285.352 | 0.65 | 1.92286 | 20.88 |
| S2 | 21.155 | 1.088 | | |
| S3 | INFINITY | 4.295 | 1.834 | 37.34 |
| S4 | INFINITY | 0 | | |
| S5 | INFINITY | 4.295 | | |
| S6 | INFINITY | 0.5 | | |
| S7* | 14.246 | 2.444 | 1.62263 | 58.16 |
| S8* | −17.36 | D1 | | |
| S9* | −11.843 | 0.5 | 1.8061 | 40.73 |
| S10* | 9.171 | 0.828 | | |
| S11 | −128.129 | 0.4 | 1.59254 | 64.11 |
| S12 | 8.285 | 1.319 | 1.92286 | 20.88 |
| S13 | 54.737 | D2 | | |
| ST | INFINITY | 0.3 | | |
| S15* | 9.961 | 1.931 | 1.62263 | 58.16 |
| S16 | −6.616 | 0.4 | 1.73938 | 42.02 |
| S17 | 80.567 | D3 | | |
| S18* | 6.318 | 2.022 | 1.58313 | 59.46 |
| S19* | −24.386 | 1.433 | | |
| S20 | 6.591 | 1.61 | 1.497 | 81.61 |
| S21 | −6.238 | 0.4 | 1.79667 | 38.61 |
| S22 | 4.749 | D4 | | |
| S23 | 18.046 | 2.18 | 1.54356 | 53.00 |
| S24 | −6.388 | 0.5 | 1.91082 | 35.25 |
| S25 | −14.95 | 1 | | |
| S26 | INFINITY | 0.3 | 1.5168 | 64.20 |
| S27 | INFINITY | 0.3 | | |
| S28 | INFINITY | 0.5 | 1.5168 | 64.20 |
| S29 | INFINITY | 1 | | |
| IMG | INFINITY | | | |

Table 10 shows design data of the second optical system of the embodiment of FIG. 14.

TABLE 10

| Lens Surface | R | D | Nd | Vd |
|---|---|---|---|---|
| OBJ | INFINITY | INFINITY | | |
| S1* | 300 | 0.65 | 1.85135 | 40.1 |
| S2* | 5 | 1.889 | | |
| S3 | 8 | 1.261 | 1.92286 | 20.88 |
| S4 | 11.662 | 14.5 | | |
| ST | INFINITY | 0.3 | | |
| S15 | 9.961 | 1.931 | 1.62263 | 58.16 |
| S16 | −6.616 | 0.4 | 1.73938 | 42.02 |
| S17 | 80.567 | D3 | | |
| S18 | 6.318 | 2.022 | 1.58313 | 59.46 |
| S19 | −24.386 | 1.433 | | |
| S20 | 6.591 | 1.61 | 1.497 | 81.61 |
| S21 | −6.238 | 0.4 | 1.79667 | 38.61 |
| S22 | 4.749 | D4 | | |
| S23 | 18.046 | 2.18 | 1.54356 | 53 |
| S24 | −6.388 | 0.5 | 1.91082 | 35.25 |
| S25 | −14.95 | 1 | | |
| S26 | INFINITY | 0.3 | 1.5168 | 64.2 |
| S27 | INFINITY | 0.3 | | |
| S28 | INFINITY | 0.5 | 1.5168 | 64.2 |
| S29 | INFINITY | 1 | | |
| IMG | INFINITY | | | |

In Table 10, "R" denotes the radius of curvature, "D" denotes the thickness of a lens at the central portion thereof or the distance between the lenses, "Nd" denotes the refractive index of a material, "Vd" denotes the Abbe's number of the material, and the mark "*" in the lens surface column denotes an aspherical surface.

The lens optical system of FIG. 14 may correct spherical aberration by including at least one aspherical lens. Since the definition of the aspherical surface is the same as that described above, a description thereof will be omitted herein.

Table 11 shows aspherical surface coefficients in the lens optical system according to the embodiment of FIG. 14.

TABLE 11

| | Lens Surface | K | A | B | C | D |
|---|---|---|---|---|---|---|
| First optical system | S7 | −0.850407 | 1.35E−06 | −2.16E−07 | 8.37E−09 | 0.00E+00 |
| | S8 | −6.237927 | −5.06E−05 | 6.78E−07 | 0.00E+00 | 0.00E+00 |
| | S9 | −10.838198 | −1.01E−04 | −1.37E−05 | 6.20E−07 | −6.87E−09 |
| | S10 | 0.690021 | 2.76E−04 | −3.42E−05 | 7.58E−07 | 0.00E+00 |
| | S15 | 1.253357 | −1.67E−04 | 0.00E+00 | 0.00E+00 | 0.00E+00 |
| | S18 | −0.234998 | 4.96E−05 | 1.51E−05 | −4.40E−07 | 0.00E+00 |
| | S19 | 3.489869 | 4.22E−04 | 1.71E−05 | −1.71E−06 | 4.13E−08 |
| Second optical system | S1 | −1 | 0.00E+00 | 0.00E+00 | 0.00E+00 | 0.00E+00 |
| | S2 | −1 | 3.45E−04 | 3.03E−06 | 0.00E+00 | 0.00E+00 |

Table 12 shows data of variable distances during zooming in the lens optical system according to the embodiment of FIG. 14.

TABLE 12

|     | Wide angle mode | Normal mode 1 | Normal mode 2 | Normal mode 3 | Tele mode | Super-wide mode |
|-----|-----------------|---------------|---------------|---------------|-----------|-----------------|
| EFL | 6.0661          | 8.6503        | 13.0229       | 20.0182       | 28.5108   | 5.3005          |
| 2ω  | 64.07           | 46.30         | 30.69         | 20.12         | 14.41     | 70.19           |
| Fno | 3.4417          | 3.7759        | 4.1948        | 4.6443        | 5.324     | 3.4853          |
| D1  | 1               | 2.917         | 5.018         | 7             | 7.919     | —               |
| D2  | 12.7            | 9.5           | 6.337         | 3.1           | 0.5       | —               |
| D3  | 5.334           | 5.116         | 4.421         | 3.839         | 2.923     | 6               |
| D4  | 4.241           | 5.733         | 7.492         | 9.319         | 11.899    | 4.2166          |

In Table 12, "EFL" denotes the effective focal length of the overall lens system, "Fno" denotes the F number, "2ω" denotes the full viewing angle, "D1" denotes the distance between the first lens group G21-1 and the second lens group G21-2, "D2" denotes the distance between the second lens group G21-2 and the aperture ST adjacent to the third lens group G21-3, "D3" denotes the distance between the third lens group G21-3 and the fourth lens group G21-4, and "D4" denotes the distance between the fourth lens group G21-4 and the fifth lens group G21-5.

FIGS. 15-18 illustrate the spherical aberration, astigmatic field curves, and distortion of the lens optical system of FIG. 14 in the wide mode, the normal mode, the tele mode, and the super-wide mode, respectively. In the lens optical system of FIG. 14, the value of "|dT/f2|" in Inequality 1, that is, the ratio of the interval between the first lens group G21-1 and the second lens group G21-2 in the tele mode with respect to the focal length of the second lens group G21-2 is 1.08, which satisfies the conditions of Inequality 1. Also, the value of "|f1/f2|" in Inequality 2, that is, the ratio of the focal length of the first lens group G21-1 with respect to the focal length of the second lens group G21-2 is 2.34, which satisfies the conditions of Inequality 2.

Although in FIG. 14 a dual lens optical system including both of the first and second optical systems is described, the scope of the invention is not limited thereto. For example, the lens optical system may be formed of only the first optical system that is the zoom lens optical system of FIG. 14. Also, as another example, a lens optical system in which the second direction in which an incident lens 271 of the first lens group G22-1 of the second optical system of FIG. 14 faces matches the first direction in which an incident lens 211 of the first lens group G21-1 of FIG. 14 faces, as illustrated in FIG. 3, may be provided.

In the above-described embodiments, the photographing devices 62, 162, and 262 may be image sensors that convert the received light representing an image of the object to an electric signal for each pixel, and a charge coupled device (CCD), or a complementary metal oxide semiconductor (CMOS) may be employed therefor. The infrared ray filters 61, 161, and 261 may be respectively arranged before the photographing devices 62, 162, and 262.

Figure 19:
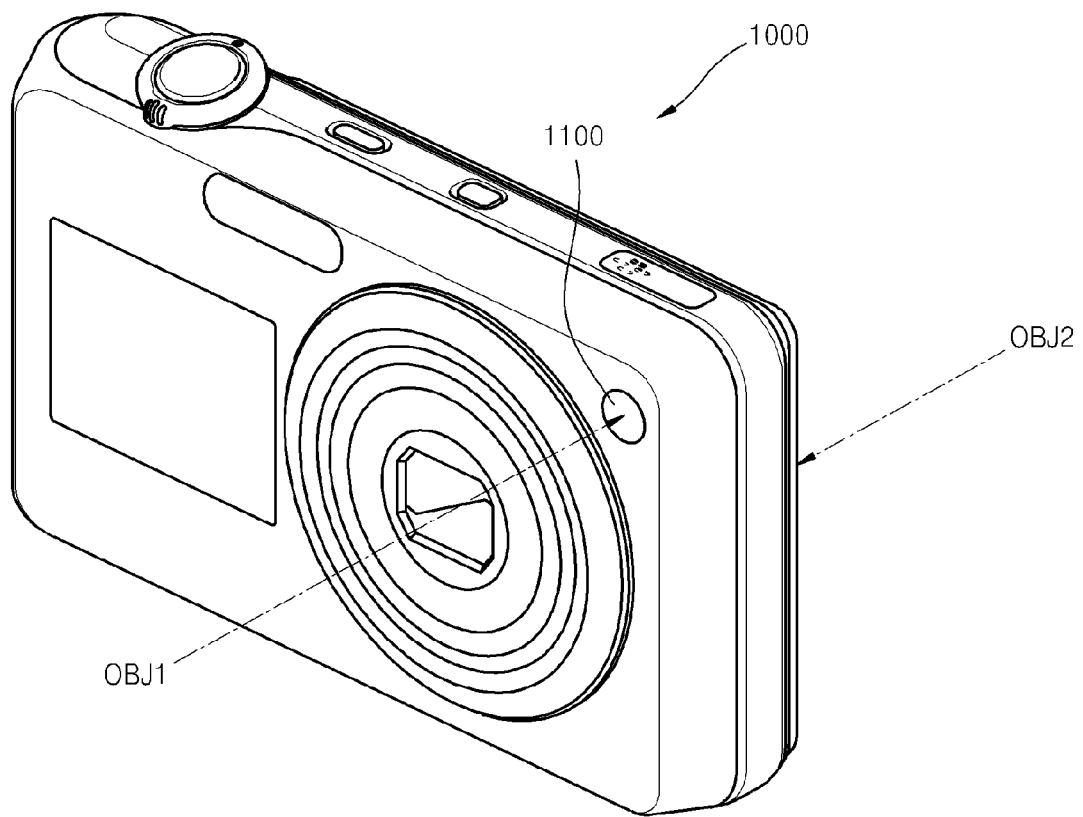
FIG. 19 schematically illustrates the structure of a digital camera employing a digital camera module according to an embodiment.

FIG. 19 schematically illustrates the structure of a digital camera 1000 employing a digital camera module according to an embodiment. Referring to FIG. 19, the digital camera 1000 according to the present embodiment includes a digital camera module according to the embodiment. The digital camera module includes not only the dual lens optical systems of the embodiments described herein but an actuating unit (not shown) actuating the reflection members to form a structure corresponding to the selected optical mode. The digital camera 1000 may include a mode selection unit (not shown) selecting any one of the first and second optical modes and an image processing unit (not shown) operating the electric signal from the photographing device to an image signal for displaying the converted signal. The selection of a mode may be performed by an input through, for example, a button unit. An image processed by the image processing unit may be displayed on a screen for user's view.

When any one of the dual lens optical systems of the embodiments of FIGS. 4, 9, and 14 is included in the digital camera 1000, the light representing an image of the object (object light OBJ1) is input to the first optical system of the dual lens optical system through an incident lens 1100. Also, although it is not illustrated, the light representing an image of the object located at the user side (object light OBJ2) is input to the second optical system of the dual lens optical system through an incident lens (not shown) located at the inner surface of the digital camera 1000. Since the dual lens optical systems of FIGS. 4, 9, and 14 can selectively photograph the image of any one of the objects located at the opposite sides without moving the whole photographing optical system, the user may selectively photograph the object lights OBJ1 and OBJ2 located at the opposite sides with respect to the screen, by viewing the screen.

The digital camera 1000 of the present embodiment may be applied as, for example, digital cameras capable of photographing a general image and a self-image with a single camera module. That is, in a self-image photographing mode, by selecting the second optical mode, the user may photograph one's own image at the position to view the image of oneself (using object light OBJ2) displayed on the screen. In a general photographing mode, by selecting the first optical mode, the user may photograph the image of another object (using object light OBJ1) displayed on the screen while viewing the object.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No item or component is essential to the practice of the invention unless the element is specifically described as "essential" or "critical".

While the photographing optical system according to the present invention and the digital camera employing the photographing optical system have been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. A lens optical system comprising a first optical system, the first optical system comprising, in order from an object side to an image side along an optical axis:

a first lens group having a positive refractive power and including a first reflection member to redirect an optical path of light representing an object from a first direction toward an image sensor;

a second lens group having a negative refractive power;

a third lens group having a positive refractive power;

a fourth lens group having a positive refractive power; and a fifth lens group having a positive refractive power, wherein, during zooming from a wide mode to a tele mode, the first lens group and the fifth lens group are fixed, the second lens group moves toward the image side, the third lens group and the fourth lens group move toward the object side, and the fourth lens group performs focusing.

2. The lens optical system of claim 1, wherein the first lens group comprises, in order from the object side along the optical axis:

a negative meniscus lens having a convex surface facing the object side;

a right-angle prism redirecting the optical path by 90° toward the image sensor; and a double-convex lens.

3. The lens optical system of claim 2, wherein at least one of a surface of the negative meniscus lens and a surface of the double-convex lens is an aspherical surface.

4. The lens optical system of claim 1, wherein the second lens group comprises at least one unit of an aspherical lens.

5. The lens optical system of claim 1, wherein the third lens group comprises at least one unit of an aspherical lens.

6. The lens optical system of claim 1, wherein the fourth lens group comprises at least one unit of an aspherical lens.

7. The lens optical system of claim 1, wherein the fifth lens group comprises a doublet lens of a lens having a positive refractive power and a lens having a negative refractive power.

8. The lens optical system of claim 1, satisfying Inequality 1:

$$1.0 < |dT/f2| < 1.5 \quad \text{[Inequality 1]}$$

wherein "dT" denotes the interval between the first lens group and the second lens group in a tele mode, and "f2" denotes the focal length of the second lens group.

9. The lens optical system of claim 1, satisfying Inequality 2:

$$2.0 < |f1/f2| < 3.0 \quad \text{[Inequality 2]}$$

wherein "f1" denotes the focal length of the first lens group, and "f2" denotes the focal length of the second lens group.

10. The lens optical system of claim 1, further comprising a second optical system, the second optical system comprising a first lens group that comprises a second reflection member to redirect an optical path of light representing an object from a second direction toward the image sensor, and the second optical system sharing at least one optical element with the first optical system.

11. The lens optical system of claim 10, wherein the first lens group of the second optical system has a negative refractive power.

12. The lens optical system of claim 10, wherein the shared at least one optical element comprises the third, fourth, and fifth lens groups of the first optical system.

13. The lens optical system of claim 12, further comprising the image sensor toward which the light representing the object from the first direction and the light representing the object from the second direction are redirected.

14. The lens optical system of claim 10, wherein the first optical system is a zoom lens optical system and the second optical system is a single focus optical system having a focal length shorter than the zoom lens optical system.

15. The lens optical system of claim 10, wherein the second reflection member of the second optical system is driven to be selectively arranged between the second lens group and the third lens group of the first optical system.

16. The lens optical system of claim 10, wherein the first lens group of the second optical system comprises at least one unit of an aspherical lens and comprises a negative meniscus lens, a positive meniscus lens, and the second reflection member, in order from the object side to the image side along the optical axis.

17. The lens optical system of claim 10, wherein the first and second directions are opposite to each other on different axes.

18. The lens optical system of claim 10, wherein the first and second directions are identical directions on different axes.

19. A digital camera module comprising:

a first optical system comprising, in order from an object side to an image side along an optical axis:

a first lens group having a positive refractive power and including a first reflection member to redirect an optical path of light representing an object from a first direction toward an image sensor;

a second lens group having a negative refractive power;

a third lens group having a positive refractive power;

a fourth lens group having a positive refractive power; and a fifth lens group having a positive refractive power, wherein, during zooming from a wide mode to a tele mode, the first lens group and the fifth lens group are fixed, the second lens group moves toward the image side, the third lens group and the fourth lens group move toward the object side, and the fourth lens group performs focusing; and a second optical system comprising a first lens group that comprises a second reflection member to redirect an optical path of light representing an object from a second direction toward the image sensor, the second optical system sharing at least one optical element with the first optical system, wherein the first optical system is used for a general photographing mode and the second optical system is used for a self-image photographing mode.

20. The digital camera module of claim 19, further comprising the image sensor toward which light representing an object from the first direction and light representing an object from the second direction are redirected.

* * * * *